United States Patent
Luo et al.

(10) Patent No.: US 11,889,446 B2
(45) Date of Patent: Jan. 30, 2024

(54) METHOD PERFORMED BY USER EQUIPMENT, AND USER EQUIPMENT

(71) Applicant: SHARP KABUSHIKI KAISHA, Osaka (JP)

(72) Inventors: Chao Luo, Shanghai (CN); Renmao Liu, Shanghai (CN); Shoichi Suzuki, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 315 days.

(21) Appl. No.: 17/417,324

(22) PCT Filed: Dec. 24, 2019

(86) PCT No.: PCT/CN2019/127906
§ 371 (c)(1),
(2) Date: Jun. 22, 2021

(87) PCT Pub. No.: WO2020/135417
PCT Pub. Date: Jul. 2, 2020

(65) Prior Publication Data
US 2022/0053442 A1 Feb. 17, 2022

(30) Foreign Application Priority Data

Dec. 24, 2018 (CN) .......................... 201811586367.0

(51) Int. Cl.
*H04W 56/00* (2009.01)
*H04W 72/044* (2023.01)
*H04W 74/08* (2009.01)

(52) U.S. Cl.
CPC ..... *H04W 56/0045* (2013.01); *H04W 72/044* (2013.01); *H04W 74/0833* (2013.01)

(58) Field of Classification Search
CPC ........... H04W 56/0045; H04W 72/044; H04W 74/0833; H04W 88/02; H04W 72/0446; H04W 72/23
See application file for complete search history.

(56) References Cited

U.S. PATENT DOCUMENTS

| | | | |
|---|---|---|---|
| 2012/0257569 A1* | 10/2012 | Jang | H04W 72/21 370/328 |
| 2014/0219204 A1* | 8/2014 | Park | H04W 74/002 370/329 |
| 2019/0069285 A1* | 2/2019 | Chandrasekhar | H04B 7/0695 |
| 2019/0215861 A1* | 7/2019 | Son | H04W 72/23 |
| 2019/0349877 A1* | 11/2019 | Alasti | H04B 7/2125 |
| 2020/0015316 A1* | 1/2020 | Islam | H04W 56/0045 |

(Continued)

OTHER PUBLICATIONS

Vodafone, "New SID: Study on NR V2X", RP-181429 3GPP TSG RAN Meeting #80, La Jolla, USA, Jun. 11-14, 2018.

(Continued)

*Primary Examiner* — Christine Ng
(74) *Attorney, Agent, or Firm* — ScienBiziP, P.C.

(57) ABSTRACT

The present disclosure provides a method performed by user equipment, comprising: receiving a timing advance command in a slot n; and determining, according to the slot n in which the timing advance command is received and/or other information related to an uplink transmission timing adjustment, time to apply the uplink transmission timing adjustment.

4 Claims, 7 Drawing Sheets

S101
RECEIVE A TIMING ADVANCE COMMAND

S102
DETERMINE TIME TO APPLY AN UPLINK TRANSMISSION TIMING ADJUSTMENT

(56) References Cited

U.S. PATENT DOCUMENTS

2020/0337011 A1* 10/2020 Jiang ................ H04W 56/0015

OTHER PUBLICATIONS

NTT Docomo, Inc., "New WID on New Radio Access Technology", RP-170855 3GPP TSG RAN Meeting #75, Dubrovnik, Croatia, Mar. 6-9, 2017.
NTT Docomo, "New SID Proposal: Study on New Radio Access Technology", RP-160671 3GPP TSG RAN Meeting #71, Göteborg, Sweden, Mar. 7-10, 2016.
Qualcomm Incorporated, "UE Processing Time and UCI Multiplexing TPs for 38.213 and 38.214", R1-1809953 3GPP TSG-RAN WG1 Meeting #94, Aug. 20-24, 2018, Gothenburg, Sweden.
Panasonic, "Summary of TA related aspects", R1-1807700 3GPP TSG-RAN WG1 #93, Busan, Korea, May 21-25, 2018.
Samsung, "CR to 38.213 capturing the RAN1#94bis and RAN1#95 meeting agreements", R1-1814394 3GPP TSG RAN WG1 Meeting #95, Spokane, USA, Nov. 12-16, 2018.

* cited by examiner

METHOD PERFORMED BY USER EQUIPMENT, AND USER EQUIPMENT

TECHNICAL FIELD

The present disclosure relates to the technical field of wireless communications, and in particular to a method performed by user equipment and corresponding user equipment.

BACKGROUND

In March 2016, at the 3rd Generation Partnership Project (3GPP) RAN #71 Plenary Session, a new research project on 5G technology standards (see Non-Patent Document 1) was approved. The goal of the research project is to develop a New Radio (NR) access technology to meet all of the application scenarios, requirements, and deployment environments of 5G. NR mainly has three application scenarios: enhanced mobile broadband (eMBB) communications, massive machine type communications (mMTC), and ultra-reliable and low latency communications (URLLC). In June 2017, at the 3rd Generation Partnership Project (3GPP) RAN #75 Plenary Session, a corresponding 5G NR work project (see Non-Patent Document 2) was approved.

The waveform supported by 5G in the downlink direction is CP-OFDM (Cyclic Prefix Orthogonal Frequency Division Multiplexing), and the waveforms supported in the uplink direction include CP-OFDM and DFT-s-OFDM (Discrete Fourier Transformation Spread Orthogonal Frequency Division Multiplexing). Each waveform supports a variety of combinations of Subcarrier Spacings (SCSs) and Cyclic Prefix (CP) lengths. Sometimes, a given SCS, or an combination of an SCS and a CP length is referred to as a "numerology". Numerologies supported by 5G are shown in Table 1, in which two CP types, "normal" and "extended", are defined. Each SCS (denoted by Δf, in unit of kHz) corresponds to an "SCS configuration" (denoted by μ).

Table 1 Numerologies Supported by 5G

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, extended |
| 3 | 120 | Normal |
| 4 | 240 | Normal |

The basic time unit in 5G is $T_c=1/(\Delta f_{max} \cdot N_f)$ second, where $\Delta f_{max}=480 \cdot 10^3$ Hz and $N_f=4096$. The constant $\kappa=T_s/T_c=64$, where $T_s$ is the basic time unit in LTE, $T_s=1/(\Delta f_{ref} \cdot N_{f,ref})$ seconds, $\Delta f_{ref}=15 \cdot 10^3$ Hz, $N_{f,ref}=2048$.

In the time domain, the length of a 5G radio frame (or system frame, sometimes referred to as a frame, with a frame number ranging from 0 to 1023) is 10 milliseconds. Each frame contains 10 subframes with a length of 1 millisecond (the subframe number in the frame ranges from 0 to 9), each subframe contains $N_{slot}^{subframe,\mu}$ slots (the slot number range in the subframe is $0 \sim N_{slot}^{subframe,\mu}-1$), and each slot contains $N_{symb}^{slot}$ OFDM symbols. Table 2 shows the values of $N_{symb}^{slot}$ and $N_{slot}^{subframe,\mu}$ in different SCS configurations. Obviously, the number of OFDM symbols in each subframe is $N_{slot}^{subframe,\mu}=N_{symb}^{slot}N_{slot}^{subframe,\mu}$. In addition, each frame is further divided into two half-frames of the same size, in which the first half frame (half frame 0) contains subframes 0 to 4, and the second half frame (half frame 1) contains subframes 5 to 9.

Table 2 Time Domain Parameters Related to SCS Configuration μ

| μ | $N_{symb}^{slot}$ | $N_{slot}^{subframe,\mu}$ |
|---|---|---|
| 0 | 14 | 1 |
| 1 | 14 | 2 |
| 2 | 14 | 4 |
| 3 | 14 | 8 |
| 4 | 14 | 16 |

In 5G, from the perspective of UE, in a serving cell, an uplink frame i for transmission should be earlier than a corresponding downlink frame i by $(N_{TA}+N_{TA,offset}) \cdot T_c$ seconds. See FIG. 1, where $N_{TA}$ represents a timing advance value (also known as timing adjustment value, or time alignment value), and $N_{TA,offset}$ represents a timing advance offset.

The value of $N_{TA}$ can be determined and/or adjusted through instruction of higher-layer (for example, a protocol layer located above a physical layer) signaling, for example, determined and/or adjusted by using a timing advance command and/or a timing adjustment indication. The value of $N_{TA,offset}$ may be configured by an higher-layer parameter n-TimingAdvanceOffset, or a default value may be used. If two uplink carriers are configured in the serving cell, the two uplink carriers use the same $N_{TA,offset}$ value. The mechanism for determining and/or adjusting the value of $N_{TA}$ may be called "transmission timing adjustment". One of reasons for performing the transmission timing adjustment is to reduce uplink interference by substantially aligning uplink slot boundaries of arriving signals at a base station transmitted by different UEs.

In Carrier Aggregation (CA) and/or Dual Connectivity (DC) scenarios, UE may need to transmit signaling and/or data on a plurality of uplink carriers. In this case, different uplink carriers may be deployed at different geographic locations, and therefore different timing advance values are required. For this reason, 5G defines the concept of TAG (Timing Advanced Group, also known as Time Alignment Group): a group of serving cells (configured with an uplink) belonging to the same TAG use the same timing reference cell and the same timing advance value (for example, a timing advance value indicated by the same timing advance command).

If a specific TAG contains a SpCell, the TAG is referred to as a PTAG (Primary Timing Advance Group); otherwise, the TAG is referred to as a STAG (Secondary Timing Advance Group).

In a random access procedure, a response to a random access preamble may be called a RAR (Random Access Response). In the RAR, a timing advance command may be contained, for example, an index value (denoted as $T_A$) is indicated by a "Timing Advance Command" field, the value range of which is 0, 1, 2, . . . , 3846. The timing advance value indicated by the timing advance command is $N_{TA}=T_A \cdot 16 \cdot 64/2^\mu$, where μ corresponds to an SCS of the first uplink transmission after the UE receives the RAR.

In other cases, the value range of $T_A$ indicated by the timing advance command is 0, 1, 2, . . . , 63. In this case, the timing advance command is used to adjust the current timing advance value (denoted as $N_{TA\_old}$) to a new timing advance value (denoted as $N_{TA\_new}$). $N_{TA\_new}=N_{TA\_old}+(T_A-31) \cdot 16 \cdot 64/2^\mu$). If the UE has a plurality of active uplink BWPs in the TAG indicated by the timing advance command, μ corresponds to the largest SCS among the plurality of active uplink BWPs.

If the UE receives a timing advance command in an uplink slot n, correspondingly, adjustment to the uplink transmission timing is applied from the starting point of an uplink slot n+k+1. $k = \lceil N_{slot}^{subframe,\mu} \cdot (N_{T,1} + N_{T,2} + N_{TA,max} + 0.5)/T_{sf} \rceil$, where $N_{T,1}$ represents the duration of $N_1$ symbols, where $N_1$ corresponds to a PDSCH processing time defined by a "UE processing capability 1" when an additional PDSCH DM-RS is configured.

$N_{T,2}$ represents the duration of $N_2$ symbols, where $N_2$ corresponds to a PUSCH processing time defined by a "UE processing capability 1" when an additional PDSCH DM-RS is configured.

An SCS used in determining $N_1$ and $N_2$ is the smallest SCS of the following:
SCSs of all uplink BWPs configured for all uplink carriers configured in the TAG indicated by the timing advance command.
SCSs of all relevant downlink BWPs (for example, all downlink BWPs configured for the downlink carriers corresponding to all the uplink carriers).

$N_{TA,max}$ is the largest timing advance value that a 12-bit timing advance command field can provide.

An SCS used in determining $N_{TA,max}$ is the smallest SCS of the following:
SCSs of all uplink BWPs configured for all uplink carriers configured in the TAG indicated by the timing advance command.
An SCS of initial active uplink BWP (initial active UL BWP, or initial UL BWP, for example, it is configured by a higher-layer parameter initialuplinkBWP).

$N_{slot}^{subframe,\mu}$ is the number of slots in each subframe.

An SCS used in determining n and $N_{slot}^{subframe,\mu}$ is the smallest SCS of the following:
SCSs of all uplink BWPs configured for all uplink carriers configured in the TAG indicated by the timing advance command.

$T_{sf}$ is the duration of a subframe, i.e., 1 millisecond.

In the existing 3GPP standard specifications on 5G, the mechanism related to transmission timing adjustment has at least the following problems:

When the UE determines, according to the received timing advance command, the slot n+k+1 for applying the uplink transmission timing adjustment, the method for determining k is problematic. For example, in the calculation formula of k (i.e., $k = \lceil N_{slot}^{subframe,\mu} \cdot (N_{T,1} + N_{T,2} + N_{TA,max} + 0.5)/T_{sf} \rceil$), the units of $N_{TA,max}$ and 0.5 are inconsistent, and direct addition thereof will cause a great loss of precision, consequently causing timing of the uplink transmission timing adjustment of the UE to be extremely inaccurate (for example, k corresponds to a large delay, making it impossible for the UE to perform the uplink transmission timing adjustment in a timely manner). For another example, there is no unambiguous definition of the time for applying a transmission timing adjustment during random access. For another example, there are no unambiguous definitions of the PDSCH processing time ($N_{T,1}$) and the PUSCH preparation time ($N_{T,2}$). For another example, there are problems in defining the slot k and the slot n+k+1 (for example, it is impossible to receive a timing advance command in time corresponding to the uplink slot k in TDD).

In addition, as 3GPP recognizes more advanced V2X (Vehicle-to-Everything) service requirements, the standardization of 5G-based V2X has begun to be put on the agenda. V2X communications refer to communications between a vehicle and any entity that may affect the vehicle. Typical V2X communications include V2I (Vehicle-to-Infrastructure), V2N (Vehicle-to-Network), V2V (Vehicle-to-Vehicle), V2P (Vehicle-to-Pedestrian), etc. In June 2018, at the 3GPP RAN #80 Plenary Session, a new research project (see Non-Patent Document 6, hereinafter briefly referred to as V2X (Rel-16) research project, or V2X Phase 3 research project) on 3GPP NR V2X was approved. In V2X (Rel-16), the interface for implementing V2X communication between UE and UE is referred to as PC5, which is also referred to as a sidelink (or briefly referred to as SL in this disclosure) at the physical layer to distinguish it from an uplink link and a downlink link. One of the goals of the V2X (Rel-16) research project is to study the design of a new NR-based SL interface, including new SL synchronization mechanisms.

Signals and channels for SL synchronization in V2X (Rel-16) include:
an SL PSS (Sidelink Primary Synchronization Signal), also known as S-PSS, or PSSS (Primary Sidelink Synchronization Signal);
an SL SSS (Sidelink Secondary Synchronization Signal), also known as S-SSS or SSSS (Secondary Sidelink Synchronization Signal); and
a PSBCH (Physical Sidelink Broadcast Channel).

The SL PSS, SL SSS, and PSBCH are organized into blocks in a time-frequency resource grid, called SL SSBs (Sidelink SS/PBCH Blocks, Sidelink Synchronization Signal/Physical Broadcast Channel Blocks), or S-SSBs. The transmission bandwidth of the SL SSBs is within an SL BWP (Sidelink Bandwidth Part) configured for the UE.

In V2X (Rel-16), potential problems of the SL synchronization mechanism design include at least:
5G (Rel-15) UE may falsely detect an SL PSS as a 5G (Rel-15) PSS, and/or falsely detect an SL SSS as a 5G (Rel-15) SSS, and/or falsely detect a PSBCH as a 5G (Rel-15) PBCH, consequently unnecessarily increasing the cell search and/or system access time of the 5G (Rel-15) UE. Therefore, it is necessary to be able to well distinguish between an SL PSS and a PSS and/or between an SL SSS and an SSS and/or between a PSBCH and a PBCH in signal/channel design and/or resource allocation and/or resource mapping and/or other aspects.
It is also necessary to be able to correctly define and indicate an SL synchronization ID in an SL SSB.
It is necessary to be able to correctly configure resources of the SL SSB.
It is necessary to be able to correctly scramble a physical layer channel related to an SL.
UE that may perform SL communication needs to be capable of obtaining consistent synchronization information (for example, synchronization information determined according to a synchronization reference of the highest priority, such as OFDM symbol timing, slots, subframes, frame numbers, etc.).

PRIOR ART DOCUMENT

Non-Patent Documents

Non-Patent Document 1: RP-160671, New SID Proposal: Study on New Radio Access Technology
Non-Patent Document 2: RP-170855, New WID on New Radio Access Technology
Non-Patent Document 3: RP-181429, New SID: Study on NR V2X

SUMMARY

In order to resolve at least some of the aforementioned problems, the present disclosure provides a method performed by user equipment, and user equipment, which can improve the time calculation method for applying an uplink transmission timing adjustment, so that UE can adjust uplink transmission timing in a timely manner, ensuring that an uplink transmission timing error of the UE is always within a proper range.

According to a first aspect of embodiments of the present disclosure, provided is a method performed by user equipment, including: receiving a timing advance command in a slot n; and determining, according to the slot n in which the timing advance command is received and/or other information related to an uplink transmission timing adjustment, time to apply the uplink transmission timing adjustment.

In the method according to the first aspect of the embodiments of the present disclosure, the time to apply the uplink transmission timing adjustment is any of the following: the beginning of a slot n+k+1; the beginning of the first uplink slot starting from the slot n+k+1 including the slot n+k+1; the beginning of the first downlink slot starting from the slot n+k+1 including the slot n+k+1; the beginning of the first flexible slot starting from the slot n+k+1 including the slot n+k+1; the beginning of the first hybrid slot starting from the slot n+k+1 including the slot n+k+1; the beginning of the first uplink slot starting from the slot n+k+1 excluding the slot n+k+1; the beginning of the first downlink slot from the slot n+k+1 excluding the slot n+k+1; the beginning of the first flexible slot starting from the slot n+k+1 excluding the slot n+k+1; and the beginning of the first hybrid slot starting from the slot n+k+1 excluding the slot n+k+1, where k is determined by any one of the following formula (1) to formula (12):

$$k = \lceil N_{slot}^{subframe,\mu} \cdot (N_{T,1} + N_{T,2} + N_{TA,max} \cdot T_c \cdot 10^3 + 0.5)/T_{sf} \rceil \quad (1)$$

$$k = \lceil N_{slot}^{subframe,\mu} \cdot \\ (N_{T,1} \cdot 10^{-3} + N_{T,2} \cdot 10^{-3} + N_{TA,max} \cdot T_c + 0.5 \cdot 10^{-3})/(T_{sf} \cdot 10^{-3}) \rceil \quad (2)$$

$$k = \lceil N_{slot}^{subframe,\mu} \cdot \\ \left(N_{T,1} \cdot \frac{1}{T_c} + N_{T,2} \cdot \frac{1}{T_c} + N_{TA,max} \cdot 10^3 + 0.5 \cdot \frac{1}{T_c}\right) / (T_{sf} \cdot 10^{-3}) \rceil \quad (3)$$

$$k = \lceil N_{slot}^{subframe,\mu} \cdot \\ \left(N_{T,1} \cdot \frac{1}{T_c} \cdot 10^{-3} + N_{T,2} \cdot \frac{1}{T_c} \cdot 10^{-3} + N_{TA,max} + 0.5 \cdot \frac{1}{T_c} \cdot 10^{-3}\right) / \\ \left(T_{sf} \cdot \frac{1}{T_c} \cdot 10^{-3}\right) \rceil \quad (4)$$

$$k = \lceil N_{slot}^{subframe,\mu} \cdot (N_{T,1} + N_{T,2} + N_{TA,max} + 0.5)/T_{sf} \rceil \quad (5)$$

$$k = \lceil N_{slot}^{subframe,\mu} \cdot (N_{T,1} + N_{T,2} + N + 0.5)/T_{sf} \rceil \quad (6)$$

$$k = \lceil N_{slot}^{subframe,\mu} \cdot (N_{T,1} + N_{T,2} + 0.5/T_{sf}) \rceil \quad (7)$$

$$k = \lceil N_{slot}^{subframe,\mu} \cdot (N_{T,1} + N_{T,2} + N_{TA,max} \cdot T_c + 0.5 \cdot 10^{-3})/(T_{sf} \cdot 10^{-3}) \rceil \quad (8)$$

$$k = \lceil N_{slot}^{subframe,\mu} \cdot (N_{T,1} \cdot 10^3 + N_{T,2} \cdot 10^3 + N_{TA,max} \cdot T_c \cdot 10^3 + 0.5)/T_{sf} \rceil \quad (9)$$

$$k = \lceil N_{slot}^{subframe,\mu} \cdot \left(N_{T,1} \cdot \frac{1}{T_c} + N_{T,2} \cdot \frac{1}{T_c} + N_{TA,max} + 0.5 \cdot \frac{1}{T_c} \cdot 10^{-3}\right) / \\ \left(T_{sf} \cdot \frac{1}{T_c} \cdot 10^{-3}\right) \rceil \quad (10)$$

$$k = \lceil N_{slot}^{subframe,\mu} \cdot (N_{T,1} + N_{T,2} + N + 0.5 \cdot 10^{-3})/(T_{sf} \cdot 10^{-3}) \rceil \quad (11)$$

$$k = \lceil N_{slot}^{subframe,\mu} \cdot (N_{T,1} + N_{T,2} + 0.5 \cdot 10^{-3})/(T_{sf} \cdot 10^{-3}) \rceil \quad (12)$$

where $N_{slot}^{subframe,\mu}$ is the number of slots in each subframe, $N_{T,1}$ is a Physical Downlink Shared Channel (PDSCH) processing time corresponding to a PDSCH processing capacity 1, $N_{T,2}$ is a Physical Uplink Shared Channel (PUSCH) preparation time corresponding to a PUSCH timing capability 1, $N_{TA,max}$ is the largest timing advance value, N is the duration corresponding to the largest timing advance value, $T_{sf}$ is the duration of one subframe, and $T_c=1/(\Delta f_{max} \cdot N_f)$, where $\Delta f_{max}=480 \cdot 10^3$ Hz and $N_f=4096$.

In the method according to the first aspect of the embodiments of the present disclosure, $N_{slot}^{subframe,\mu}$ is replaced with $N_{slot}^{frame,\mu}$; and $T_{sf}$ is replaced with $T_f$, where $N_{slot}^{frame,\mu}$ is the number of slots in each frame, and $T_f$ is the duration of one frame.

In the method according to the first aspect of the embodiments of the present disclosure, when any one of the slot n, $N_{T,1}$, $N_{T,2}$, $N_{TA,max}$, $N_{slot}^{subframe,\mu}$, $N_{slot}^{frame,\mu}$, and the slot n+k+1 is determined, a Subcarrier Spacing (SCS) used is an SCS in any one of the following items, or the smallest SCS or largest SCS in any one of the following items, including: SCSs of all uplink BWPs configured for all uplink carriers configured in a Timing Advance Group (TAG); SCSs of all relevant downlink BWPs; SCS(s) of initial active uplink BWP(s); SCS(s) of initial active downlink BWP(s); an SCS of the first uplink transmission after the user equipment receives a RAR; and an SCS of downlink transmission including the timing advance command.

In the method according to the first aspect of the embodiments of the present disclosure, a BWP in which the first uplink transmission is located is an initial active uplink BWP or an active uplink BWP, where the initial active BWP uplink and/or the active uplink BWP are located on an uplink carrier corresponding to the random access preamble, or on another uplink carrier.

In the method according to the first aspect of the embodiments of the present disclosure, the SCS used in determining the slot n+k+1 is the same as the SCS used in determining the slot n.

In the method according to the first aspect of the embodiments of the present disclosure, in the case where the PDSCH processing time is denoted by $N_1$ according to the number of symbols, if $N_{T,1}$ is in unit of millisecond, the relation between $N_{T,1}$ and $N_1$ is any one of the following relations (13) to (15), or one of the following relations (13) to (15) in the case of a normal Cyclic Prefix (CP) and another one in the case of an extended CP, $$N_{T,1}=N_1 \cdot (2048+144) \cdot \kappa \cdot 2^{-\mu} \cdot T_c \cdot 10^3 \quad (13)$$

$$N_{T,1}=N_1 \cdot (2048+512) \cdot \kappa \cdot 2^{-\mu} \cdot T_c \cdot 10^3 \quad (14)$$

$$N_{T,1}=N_1 \cdot ((2048+144) \cdot \kappa \cdot 2^{-\mu}+16 \cdot \kappa) \cdot T_c \cdot 10^3 \quad (15)$$

if $N_{T,1}$ is in unit of second, the relation between $N_{T,1}$ and $N_1$ is any one of the following relations (16) to (18), or one of the following relations (16) to (18) in the case of a normal CP and another one in the case of an extended CP, $$N_{T,1} = N_1 \cdot (2048+144) \cdot \kappa \cdot 2^{-\mu} \cdot T_c \qquad (16)$$

$$N_{T,1} = N_1 \cdot (2048+512) \cdot \kappa \cdot 2^{-\mu} \cdot T_c \qquad (17)$$

$$N_{T,1} = N_1 \cdot ((2048+144) \cdot \kappa \cdot 2^{-\mu} + 16 \cdot \kappa) \cdot T_c \qquad (18)$$

In the method according to the first aspect of the embodiments of the present disclosure, in the case where the PUSCH preparation time is denoted by $N_2$ according to the number of symbols, if $N_{T,2}$ is in unit of millisecond, the relation between $N_{T,2}$ and $N_2$ is any of the following relations (19) to (21), or one of the following relations (19) to (21) in the case of a normal CP and another one in the case of an extended CP, $$N_{T,2} = N_2 \cdot (2048+144) \cdot \kappa \cdot 2^{-\mu} \cdot T_c \cdot 10^3 \qquad (19)$$

$$N_{T,2} = N_2 \cdot (2048+512) \cdot \kappa \cdot 2^{-\mu} \cdot T_c \cdot 10^3 \qquad (20)$$

$$N_{T,2} = N_2 \cdot ((2048+144) \cdot \kappa \cdot 2^{-\mu} + 16 \cdot \kappa) \cdot T_c \cdot 10^3 \qquad (21)$$

if $N_{T,2}$ is in unit of second, the relation between $N_{T,2}$ and $N_2$ is any one of the following relations (22) to (24), or one of the following relations (22) to (24) in the case of a normal CP and another one in the case of an extended CP, $$N_{T,2} = N_2 \cdot (2048+144) \cdot \kappa \cdot 2^{-\mu} \cdot T_c \qquad (22)$$

$$N_{T,2} = N_2 \cdot (2048+512) \cdot \kappa \cdot 2^{-\mu} \cdot T_c \qquad (23)$$

$$N_{T,2} = N_2 \cdot ((2048+144) \cdot \kappa \cdot 2^{-\mu} + 16 \cdot \kappa) \cdot T_c \qquad (24)$$

In the method according to the first aspect of the embodiments of the present disclosure, the normal CP case refers to any one of the following cases or any combination of a plurality of the following cases combined by "and" or "or": any uplink BWP configured for any uplink carrier configured in the TAG is configured with a normal CP; at least one uplink BWP in each uplink carrier configured in the TAG is configured with a normal CP; all uplink BWPs configured for all uplink carriers configured in the TAG are configured with normal CPs; at least one of all downlink BWPs configured for the downlink carriers corresponding to all the uplink carriers configured in the TAG is configured with a normal CP; all the downlink BWPs configured for the downlink carriers corresponding to all the uplink carriers configured in the TAG are configured with normal CPs; at least one of the downlink BWPs corresponding to all the uplink BWPs configured for all the uplink carriers configured in the TAG is configured with a normal CP; and the downlink BWPs corresponding to all the uplink BWPs configured for all the uplink carriers configured in the TAG are configured with normal CPs, and the extended CP case refers to any one of the following cases or any combination of a plurality of the following cases combined by "and" or "or": any uplink BWP configured for any uplink carrier configured in the TAG is configured with an extended CP; at least one uplink BWP in each uplink carrier configured in the TAG is configured with an extended CP; all the uplink BWPs configured for all the uplink carriers configured in the TAG are configured with extended CPs; at least one of all the downlink BWPs configured for the downlink carriers corresponding to all the uplink carriers configured in the TAG is configured with an extended CP; all the downlink BWPs configured for the downlink carriers corresponding to all the uplink carriers configured in the TAG are configured with extended CPs; at least one of the downlink BWPs corresponding to all the uplink BWPs configured for all the uplink carriers configured in the TAG is configured with an extended CP; and the downlink BWPs corresponding to all the uplink BWPs configured for all the uplink carriers configured in the TAG are all configured with extended CPs.

According to a second aspect of the embodiments of the present disclosure, provided is user equipment, including: a processor; and a memory storing instructions, where the instructions, when run by the processor, perform the method executed by user equipment according to any one of the items of the first aspect.

Effect of Invention

According to the present disclosure, it is possible to improve a calculation method of time for applying an uplink transmission timing adjustment, so that UE can adjust uplink transmission timing in a timely manner, ensuring that an uplink transmission timing error of the UE is always within a proper range.

BRIEF DESCRIPTION OF THE DRAWINGS

The above and other features of the present disclosure will become more apparent with the following detailed description in conjunction with the accompanying drawings.

DETAILED DESCRIPTION

Figure 1:
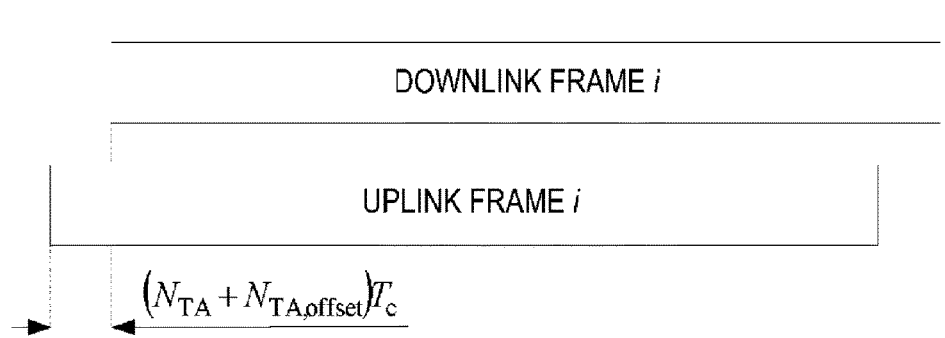
FIG. 1 is a diagram showing the concept that an uplink frame is advanced relative to a downlink frame in the existing 3GPP standard specifications on 5G.

The following describes the present disclosure in detail with reference to the accompanying drawings and specific embodiments. It should be noted that the present disclosure should not be limited to the specific embodiments described below. In addition, for simplicity, detailed description of the prior art not directly related to the present disclosure is omitted to prevent confusion in understanding the present disclosure.

A plurality of embodiments according to the present disclosure are described in detail below by using a 5G mobile communication system and its subsequent evolved versions as an exemplary application environment. However, it is to be noted that the present invention is not limited to the following embodiments, and rather, it is applicable to many other wireless communication systems, such as a communication system later than 5G and a 4G mobile communication system earlier than the 5G.

Some terms related to the present disclosure are described below. If not specifically indicated, the terms related to the present disclosure use the definitions herein. The terms given in the present disclosure may be named differently in LTE, LTE-Advanced, LTE-Advanced Pro, NR, and later communication systems, but unified terms are used in the present disclosure. When applied to a specific system, the terms may be replaced with terms used in the corresponding system.

3GPP: 3rd Generation Partnership Project
BWP: Bandwidth Part
CA: Carrier Aggregation
CP: Cyclic Prefix
CP-OFDM: Cyclic Prefix Orthogonal Frequency Division Multiplexing
DC: Dual Connectivity
DFT-s-OFDM: Discrete Fourier Transformation Spread Orthogonal Frequency Division Multiplexing
DL: Downlink
DL-SCH: Downlink Shared Channel
DM-RS: Demodulation Reference Signal
eMBB: Enhanced Mobile Broadband
IE: Information Element
LCID: Logical Channel ID, Logical Channel Identity
LTE-A: Long Term Evolution-Advanced
MAC: Medium Access Control
MAC CE: MAC Control Element
MCG: Master Cell Group
mMTC: massive Machine Type Communication
NR: New Radio
NUL: Normal Uplink
OFDM: Orthogonal Frequency Division Multiplexing
PBCH: Physical Broadcast Channel
PDSCH: Physical Downlink Shared Channel
PSBCH: Physical Sidelink Broadcast Channel
PSCCH: Physical Sidelink Control Channel
PSSCH: Physical Sidelink Shared Channel
PSS: Primary Synchronization Signal
PSSS: Primary Sidelink Synchronization Signal
PTAG: Primary Timing Advance Group
PUSCH: Physical Uplink Shared Channel
RAR: Random Access Response
RB: Resource Block
RE: Resource Element
RRC: Radio Resource Control
SCG: Secondary Cell Group
SCS: Subcarrier Spacing
SFN: System Frame Number
SIB: System Information Block
SL: Sidelink
SL BWP: Sidelink Bandwidth Part
SL PSS: Sidelink Primary Synchronization Signal
SL SSB: Sidelink SS/PBCH Block, Sidelink Synchronization Signal/Physical Broadcast Channel Block
SL SSS: Sidelink Secondary Synchronization Signal
SpCell: Special Cell
SSB: SS/PBCH block
SSS: Secondary Synchronization Signal
SSSS: Secondary Sidelink Synchronization Signal
STAG: Secondary Timing Advance Group
SUL: Supplementary Uplink
TA: Timing Advance
TAG: Timing Advance Group
TDD: Time Division Duplexing
UE: User Equipment
UL: Uplink
URLLC: Ultra-Reliable and Low Latency Communication
V2I: Vehicle-to-Infrastructure
V2N: Vehicle-to-Network
V2P: Vehicle-to-Pedestrian
V2V: Vehicle-to-Vehicle
V2X: Vehicle-to-Everything Unless otherwise specified, in all the embodiments and implementations of the present disclosure:

$T_c=1/(\Delta f_{max} \cdot N_f)$ seconds, where $\Delta f_{max}=480 \cdot 10^3$ Hz and $N_f=4096$.

$T_s=1/(\Delta f_{ref} \cdot N_{f,ref})$ seconds, where $\Delta f_{ref}=15 \cdot 10^3$ Hz and $N_{f,ref}=2048$.

$\kappa = T_s/T_c = 64$.

$N_{slot}^{subframe,\mu}$ is the number of slots in each subframe.

$T_{sf}$ is the duration of one subframe. $T_{sf}=1$ millisecond.

$T_f$ is the duration of one frame. $T_f=10$ milliseconds.

A downlink slot refers to a slot in which all symbols are downlink symbols.

A flexible slot refers to a slot in which all symbols are flexible symbols.

An uplink slot refers to a slot in which all symbols are uplink symbols.

A hybrid slot refers to a slot that contains at least two of downlink symbols, flexible symbols, and uplink symbols.

Resources (for example, resource blocks, or subcarriers) occupied by a physical layer channel or signal, or a combination of a plurality of physical layer channels and/or signals (for example, an SSB, or an SL SSB) in the frequency domain is numbered starting from 0, and resources (for example, symbols, or slots, or subframes, or frames) occupied in the time domain are also numbered starting from 0. For example, the number of the lowest numbered resource block of an SSB is 0, and the number of the lowest numbered subcarrier of the resource block is 0.

Embodiment 1

A method performed by user equipment according to Embodiment 1 of the present disclosure will be described below with reference to FIG. 2.

Figure 2:
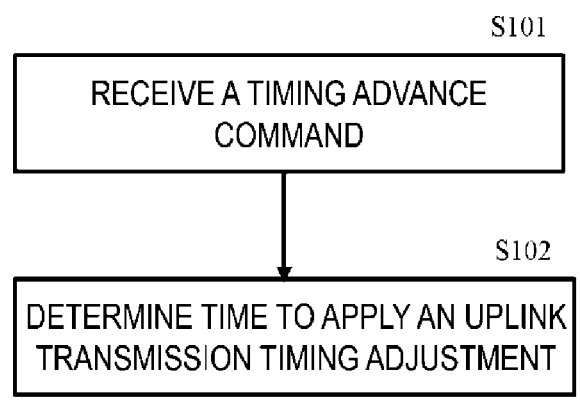
FIG. 2 is a flowchart showing a method performed by user equipment according to Embodiment 1 of the present disclosure.

FIG. 2 is a flowchart showing a method performed by user equipment according to Embodiment 1 of the present disclosure.

As shown in FIG. 2, in Embodiment 1 of the present disclosure, steps performed by the user equipment (UE) include: step S101 and step S102.

Specifically, in step S101, a timing advance command is received.

For example, the timing advance command is received from a base station in slot n. Among them:

The timing advance command can indicate an index value (denoted as $T_A$).

The timing advance command may be included in a RAR, and the RAR may be a response to a random access preamble. For example, the RAR may be a MAC PDU, which may include a MAC subPDU; the load of the MAC subPDU may include a "Timing Advance Command" field for placing the timing advance command. The size of the "Timing Advance Command" field may be 12 bits, and the range of the index value $T_A$ indicated thereby may be 0, 1, 2, . . . , 3846.

In this case, a TAG corresponding to the timing advance command may be a TAG to which a cell corresponding to an uplink carrier corresponding to the random access preamble belongs, or may be indicated in the RAR (for example, indicated in the MAC subPDU included in the RAR), or may be a TAG indicated in other ways. Embodiment 1 of the present disclosure does not limit the TAG corresponding to the timing advance command in this case.

The timing advance command may also be included in a MAC CE called "Timing Advance Command". For example, the MAC CE may be identified by a MAC subheader, the MAC subheader may be used for a DL-SCH, and the value of a LCID field in the MAC subheader may be 61. For another example, the MAC CE may include a TAG field and a "Timing Advance Command" field. The TAG field may be 2 bits, for determining the TAG corresponding to the timing advance command; the "Timing Advance Command" field may be 6 bits, and the range of the index value $T_A$ indicated thereby may be 0, 1, 2, . . . , 63.

The timing advance command may also be included in other higher-layer messages (like other MAC messages, or RRC messages). Embodiment 1 of the present disclosure does not limit the message carrying the timing advance command.

When the slot n is determined, an SCS used may be an SCS in any one of the following items (if there is only one SCS in the items), or may be the smallest SCS in any one or a plurality of the following items, or may be the largest SCS in any one or a plurality of the following items:

SCSs of all uplink BWPs configured for all uplink carriers configured in the TAG.

SCSs of all relevant downlink BWPs (for example, all downlink BWPs configured for the downlink carriers corresponding to all uplink carriers configured in the TAG, or, for another example, downlink BWPs corresponding to all uplink BWPs configured for all uplink carriers configured in the TAG).

SCS(s) of initial active uplink BWP(s) (initial active UL BWP(s), or referred to as initial uplink BWP(s) (initial UL BWP(s)), for example, each configured by a higher-layer parameter initialuplinkBWP).

SCS(s) of initial active downlink BWP(s) (initial active DL BWP(s), or referred to as initial downlink BWP(s) (initial DL BWP(s)), for example, each configured by a higher-layer parameter initialDownlinkBWP).

An SCS of the first uplink transmission after the UE receives the RAR. A BWP in which the first uplink transmission is located may be an initial active uplink BWP, or may be an active uplink BWP; the initial active uplink BWP and/or the active uplink BWP may be on an uplink carrier corresponding to the random access preamble, or may be on another uplink carrier.

An SCS of the downlink transmission (for example, PDSCH) containing the timing advance command.

When the slot n is determined, the SCS used may also be determined in other ways. Embodiment 1 of the present disclosure does not limit the SCS used in determining the slot n.

The type of the slot n may not be limited by any means (for example, the slot may be a downlink slot, or may be a flexible slot, or may be an uplink slot, or may be a hybrid slot), or may be limited to any one of a downlink slot, a flexible slot, an uplink slot, and a hybrid slot, or may be limited to a combination of any two or more of a downlink slot, a flexible slot, an uplink slot, and a hybrid slot.

In addition, in step S102, time for applying an uplink transmission timing adjustment is determined according to the time when the timing advance command is received and/or other information related to the uplink transmission timing adjustment.

For example, according to the slot n in which the timing advance command is received and other information related to the uplink transmission timing adjustment, the time t for applying the uplink transmission timing adjustment is determined (for example, starting to apply the uplink transmission timing adjustment from the time t; for another example, starting to apply the uplink transmission timing adjustment before the time t; for another example, starting to apply the uplink transmission timing adjustment at time no later than the time t). The time t may be any one of the following:

The beginning of a slot n+k+1.

The beginning of the first uplink slot starting from the slot n+k+1 (including the slot n+k+1).

The beginning of the first downlink slot starting from the slot n+k+1 (including the slot n+k+1).

The beginning of the first flexible slot starting from the slot n+k+1 (including the slot n+k+1).

The beginning of the first hybrid slot starting from the slot n+k+1 (including the slot n+k+1).

The beginning of the first uplink slot starting from the slot n+k+1 (excluding the slot n+k+1).

The beginning of the first downlink slot starting from the slot n+k+1 (excluding the slot n+k+1).

The beginning of the first flexible slot starting from slot n+k+1 (excluding the slot n+k+1).

The beginning of the first hybrid slot starting from slot n+k+1 (excluding the slot n+k+1).

Among them:

k may be determined in any of the following ways:

$$k = \lceil N_{slot}^{subframe,\mu} \cdot (N_{T,1} + N_{T,2} + N_{TA,max} \cdot T_c \cdot 10^3 + 0.5) / T_{sf} \rceil. \quad (a)$$

$$k = \lceil N_{slot}^{subframe,\mu} \cdot (N_{T,1} \cdot 10^{-3} + N_{T,2} \cdot 10^{-3} + N_{TA,max} \cdot T_c + 0.5 \cdot 10^{-3}) / (T_{sf} \cdot 10^{-3}) \rceil. \quad (b)$$

$$k = \lceil N_{slot}^{subframe,\mu} \cdot \left(N_{T,1} \cdot \frac{1}{T_c} + N_{T,2} \cdot \frac{1}{T_c} + N_{TA,max} \cdot 10^3 + 0.5 \cdot \frac{1}{T_c}\right) / \left(T_{sf} \cdot \frac{1}{T_c}\right) \rceil. \quad (c)$$

$$k = \lceil N_{slot}^{subframe,\mu} \cdot \left(N_{T,1} \cdot \frac{1}{T_c} \cdot 10^{-3} + N_{T,2} \cdot \frac{1}{T_c} \cdot 10^{-3} + N_{TA,max} + 0.5 \cdot \frac{1}{T_c} \cdot 10^{-3}\right) / \left(T_{sf} \cdot \frac{1}{T_c} \cdot 10^{-3}\right) \rceil. \quad (d)$$

$$k = \lceil N_{slot}^{subframe,\mu} \cdot (N_{T,1} + N_{T,2} + N_{TA,max} + 0.5) / T_{sf} \rceil. \quad (e)$$

$$k = \lceil N_{slot}^{subframe,\mu} \cdot (N_{T,1} + N_{T,2} + N + 0.5) / T_{sf} \rceil. \quad (f)$$

$$k = \lceil N_{slot}^{subframe,\mu} \cdot (N_{T,1} + N_{T,2} + 0.5) / T_{sf} \rceil. \quad (g)$$

$$k = \lceil N_{slot}^{subframe,\mu} \cdot (N_{T,1} + N_{T,2} + N_{TA,max} \cdot T_c + 0.5 \cdot 10^{-3}) / (T_{sf} \cdot 10^{-3}) \rceil. \quad (h)$$

$$k = \lceil N_{slot}^{subframe,\mu} \cdot (N_{T,1} \cdot 10^3 + N_{T,2} \cdot 10^3 + N_{TA,max} \cdot T_c \cdot 10^3 + 0.5) / T_{sf} \rceil. \quad (i)$$

$$k = \lceil N_{slot}^{subframe,\mu} \cdot \left(N_{T,1} \cdot \frac{1}{T_c} + N_{T,2} \cdot \frac{1}{T_c} + N_{TA,max} + 0.5 \cdot \frac{1}{T_c} \cdot 10^{-3}\right) / \left(T_{sf} \cdot \frac{1}{T_c} \cdot 10^{-3}\right). \quad (j)$$

-continued $$k = \lceil N_{slot}^{subframe,\mu} \cdot (N_{T,1} + N_{T,2} + N + 0.5 \cdot 10^{-3})/(T_{sf} \cdot 10^{-3}) \rceil. \quad (k)$$

$$k = \lceil N_{slot}^{subframe,\mu} \cdot (N_{T,1} + N_{T,2} + 0.5 \cdot 10^{-3})/(T_{sf} \cdot 10^{-3}) \rceil. \quad (l)$$

Among them:

Optionally, in any of the above equations, $N_{slot}^{subframe,\mu}$ may also be replaced with $N_{slot}^{subframe,\mu}$, and $T_{sf}$ may be replaced with $T_f$.

$N_{T,1}$ is a PDSCH processing time corresponding to a PDSCH processing capability 1.

Among them:

In some cases, when the context is clear, for example, when it can be seen from the context that a capability related to PDSCH processing is referred to, the PDSCH processing capability 1 may also be referred to as a UE processing capability 1.

The PDSCH processing capability 1 may be a PDSCH processing capability 1 when an additional PDSCH DM-RS is configured. For example, a parameter dmrs-AdditionalPosition in DMRS-DownlinkConfig in a higher-layer parameter dmrs-DownlinkForPDSCHMappingTypeA is not configured or the configured value is not "pos0", or a parameter dmrs-AdditionalPosition in DMRS-DownlinkConfig in a higher-layer parameter dmrsDownlinkForPDSCHl-MappingTypeB is not configured or the configured value is not "pos0".

$N_{T,1}$ may be in unit of millisecond or second. For example, in formulas (a), (b), (c), (d), (e), (f), and (g), $N_{T,1}$ may be in unit of millisecond. In formulas (h), (i), (j), (k), and (l), $N_{T,1}$ may be in unit of second.

The PDSCH processing time may also be represented according to the number of symbols, denoted as $N_1$. For example, the $N_{T,1}$ may be the duration of $N_1$ symbols, where the $N_1$ symbols may be $N_1$ consecutive symbols.

Optionally, if $N_{T,1}$ is in unit of millisecond, the relation between $N_{T,1}$ and $N_1$ may be fixed to any one of the following (that is, regardless of how a CP is configured), or one of the following (such as the first) may be used in the case of a normal CP and another one of the following (such as the second) is used in the case of an extended CP:

$$N_{T,1} = N_1 \cdot (2048+144) \cdot \kappa \cdot 2^{-\mu} \cdot T_c \cdot 10^3$$

$$N_{T,1} = N_1 \cdot (2048+512) \cdot \kappa \cdot 2^{-\mu} \cdot T_c \cdot 10^3$$

$$N_{T,1} = N_1 \cdot ((2048+144) \cdot \kappa \cdot 2^{-\mu} + 16 \cdot \kappa) \cdot T_c \cdot 10^3$$

Optionally, if $N_{T,1}$ is in unit of second, the relation between $N_{T,1}$ and $N_1$ may be fixed to any one of the following (that is, regardless of how a CP is configured), or one of the following (such as the first) may be used in the case of a normal CP and another one of the following (such as the second) is used in the case of an extended CP:

$$N_{T,1} = N_1 \cdot (2048+144) \cdot \kappa \cdot 2^{-\mu} \cdot T_c$$

$$N_{T,1} = N_1 \cdot (2048+512) \cdot \kappa \cdot 2^{-\mu} \cdot T_c$$

$$N_{T,1} = N_1 \cdot ((2048+144) \cdot \kappa \cdot 2^{-\mu} + 16 \cdot \kappa) \cdot T_c$$

Optionally, the normal CP case may refer to any one of the following cases or any combination of a plurality of the following cases combined by "and" or "or":

Any uplink BWP configured for any uplink carrier configured in the TAG is configured with a normal CP.

At least one uplink BWP in each uplink carrier configured in the TAG is configured with a normal CP.

All uplink BWPs configured for all uplink carriers configured in the TAG are configured with normal CPs.

At least one of all downlink BWPs configured for the downlink carriers corresponding to all uplink carriers configured in the TAG is configured with a normal CP.

All downlink BWPs configured for the downlink carriers corresponding to all uplink carriers configured in the TAG are configured with normal CPs.

At least one of the downlink BWPs corresponding to all uplink BWPs configured for all the uplink carriers configured in the TAG is configured with a normal CP.

The downlink BWPs corresponding to all uplink BWPs configured for all uplink carriers configured in the TAG are all configured with normal CPs.

Optionally, the normal CP case may also refer to any case that does not belong to the "extended CP case" (when the extended CP case does not refer to any case that does not belong to the "normal CP case").

Optionally, the extended CP case may refer to any one of the following cases or any combination of a plurality of the following cases combined by "and" or "or":

Any uplink BWP configured for any uplink carrier configured in the TAG is configured with an extended CP.

At least one uplink BWP in each uplink carrier configured in the TAG is configured with an extended CP.

All uplink BWPs configured for all uplink carriers configured in the TAG are configured with extended CPs.

At least one of all the downlink BWPs configured for the downlink carriers corresponding to all uplink carriers configured in the TAG is configured with an extended CP.

All downlink BWPs configured for the downlink carriers corresponding to all uplink carriers configured in the TAG are configured with extended CPs.

At least one of the downlink BWPs corresponding to all uplink BWPs configured for all uplink carriers configured in the TAG is configured with an extended CP.

The downlink BWPs corresponding to all uplink BWPs configured for all the uplink carriers configured in the TAG are all configured with extended CPs.

Optionally, the extended CP case may also refer to any case that does not belong to the "normal CP case" (when the normal CP case does not refer to any case that does not belong to the "extended CP case").

$N_{T,2}$ is a PUSCH preparation time corresponding to a PUSCH timing capability 1.

Among them:

In some cases, when the context is clear, for example, when it can be seen from the context that a capability related to PUSCH timing is referred to, the PUSCH timing capability 1 may also be referred to as a UE processing capability 1.

$N_{T,2}$ may be in unit of millisecond or second. For example, in formulas (a), (b), (c), (d), (e), (f), and (g), $N_{T,2}$ may be in unit of millisecond. In formulas (h), (i), (j), (k) and (l), $N_{T,2}$ may be in unit of second.

The PUSCH preparation time may also be represented according to the number of symbols, denoted as $N_2$. For example, $N_{T,2}$ may be the duration of $N_2$ symbols, where the $N_2$ symbols may be $N_2$ consecutive symbols.

Optionally, if $N_{T,2}$ is in unit of millisecond, the relation between $N_{T,2}$ and $N_2$ may be fixed to any one of the following (that is, regardless of how a CP is configured), or one of the following (such as the first) may be used in the case of a normal CP and another one of the following (such as the second) is used in the case of an extended CP:

$$N_{T,2}=N_1 \cdot (2048+144) \cdot \kappa \cdot 2^{-\mu} \cdot T_c \cdot 10^3$$

$$N_{T,2}=N_1 \cdot (2048+512) \cdot \kappa \cdot 2^{-\mu} \cdot T_c \cdot 10^3$$

$$N_{T,2}=N_1 \cdot ((2048+144) \cdot \kappa \cdot 2^{-\mu}+16 \cdot \kappa) \cdot T_c \cdot 10^3$$

Optionally, if $V_{T,2}$ is in unit of second, the relation between $N_{T,2}$ and $N_2$ may be fixed to any one of the following (that is, regardless of how a CP is configured), or one of the following (such as the first) may be used in the case of a normal CP and another one of the following (such as the second) is used in the case of an extended CP:

$$N_{T,2}=N_2 \cdot (2048+144) \cdot \kappa \cdot 2^{-\mu} \cdot T_c$$

$$N_{T,2}=N_2 \cdot (2048+512) \cdot \kappa \cdot 2^{-\mu} \cdot T_c$$

$$N_{T,2}=N_2 \cdot ((2048+144) \cdot \kappa \cdot 2^{-\mu}+16 \cdot \kappa) \cdot T_c$$

Optionally, the normal CP case may refer to any one of the following cases or any combination of a plurality of the following cases combined by "and" or "or":

Any uplink BWP configured for any uplink carrier configured in the TAG is configured with a normal CP.

At least one uplink BWP in each uplink carrier configured in the TAG is configured with a normal CP.

All uplink BWPs configured for all uplink carriers configured in the TAG are configured with normal CPs.

At least one of all downlink BWPs configured for the downlink carriers corresponding to all uplink carriers configured in the TAG is configured with a normal CP.

All downlink BWPs configured for the downlink carriers corresponding to all uplink carriers configured in the TAG are configured with normal CPs.

At least one of the downlink BWPs corresponding to all uplink BWPs configured for all the uplink carriers configured in the TAG is configured with a normal CP.

The downlink BWPs corresponding to all uplink BWPs configured for all uplink carriers configured in the TAG are all configured with normal CPs.

Optionally, the normal CP case may also refer to any case that does not belong to the "extended CP case" (when the extended CP case does not refer to any case that does not belong to the "normal CP case").

Optionally, the extended CP case may refer to any one of the following cases or any combination of a plurality of the following cases combined by "and" or "or":

Any uplink BWP configured for any uplink carrier configured in the TAG is configured with an extended CP.

At least one uplink BWP in each uplink carrier configured in the TAG is configured with an extended CP.

All uplink BWPs configured for all uplink carriers configured in the TAG are configured with extended CPs.

At least one of all downlink BWPs configured for the downlink carriers corresponding to all uplink carriers configured in the TAG is configured with an extended CP.

All downlink BWPs configured for the downlink carriers corresponding to all uplink carriers configured in the TAG are configured with extended CPs.

At least one of the downlink BWPs corresponding to all uplink BWPs configured for all the uplink carriers configured in the TAG is configured with an extended CP.

The downlink BWPs corresponding to all uplink BWPs configured for all uplink carriers configured in the TAG are all configured with extended CPs.

Optionally, the extended CP case may also refer to any case that does not belong to the "normal CP case" (when the normal CP case does not refer to any case that does not belong to the "extended CP case").

$N_{TA,max}$ refers to the largest timing advance value. For example, $N_{TA,max}$ may be equal to the largest timing advance value that a 12-bit timing advance command field can provide (for example, for an SCS of $2^\mu \cdot 15$ kHz, $N_{TA,max}=T_{A,max} \cdot 16 \cdot 64/2^\mu$, where $T_{A,max}$ is the largest index value that can be indicated by the timing advance command field, such as 3846).

N refers to a duration corresponding to the largest timing advance value. N may be in unit of millisecond or second. For example, in formula (f), N may be in unit of millisecond, and the relation between N and $N_{TA,max}$ may be $N=N_{TA,max} \cdot T_c \cdot 10^3$. For another example, in formula (k), N may be in unit of second, and the relation between N and $N_{TA,max}$ may be $N=N_{TA,max} \cdot T_c$.

When any one of $N_{T,1}$, $N_{T,2}$, $N_{TA,max}$, $N_{slot}^{subframe,\mu}$, $N_{slot}^{frame,\mu}$, and the slot n+k+1 is determined, an SCS used may be an SCS in any one of the following items (if there is only one SCS in the items), or may be the smallest SCS in any one or a plurality of the following items, or may be the largest SCS in any one or a plurality of the following items:

SCSs of all uplink BWPs configured for all uplink carriers configured in the TAG.

SCSs of all relevant downlink BWPs (for example, all downlink BWPs configured for downlink carriers corresponding to all uplink carriers configured in the TAG, or, for another example, downlink BWPs corresponding to all uplink BWPs configured for all uplink carriers configured in the TAG).

SCS(s) of initial active uplink BWP(s) (for example, each configured by a higher-layer parameter initialuplinkBWP).

SCS(s) of initial active downlink BWP(s) (for example, each configured by a higher-layer parameter initialDownlinkBWP).

An SCS of the first uplink transmission after the UE receives the RAR. A BWP in which the first uplink transmission is located may be an initial active uplink BWP or an active uplink BWP; the initial active uplink BWP and/or the active uplink BWP may be on the uplink carrier corresponding to the random access preamble, or may be on another uplink carrier.

An SCS of downlink transmission (for example, PDSCH) containing the timing advance command.

When the slot n+k+1 is determined, the SCS used may also be the same as the SCS used in determining the slot n.

When any one of $N_{T,1}$, $N_{T,2}$, $N_{TA,max}$, $N_{slot}^{subframe,\mu}$, $N_{slot}^{frame,\mu}$, and the slot n+k+1 is determined, the SCS used may also be determined in other ways. Embodiment 1 of the present disclosure does not limit the SCS used in determining any one of $N_{T,1}$, $N_{T,2}$, $N_{TA,max}$, $N_{slot}^{subframe,\mu}$, $N_{slot}^{frame,\mu}$, and the slot n+k+1.

The type of the slot n+k+1 may be not limited by any means (for example, the slot may be a downlink slot, or may be a flexible slot, or may be an uplink slot, or may be a hybrid slot), or may be limited to the same type as that of the slot n (for example, if the slot n is an uplink slot, and the slot n+k+1 is also limited to an uplink slot, it means that the slots n, n+1, . . . , n+k+1 are all uplink slots; in this case, in the case of unpaired spectrum, there may be a non-uplink slot between the slot n and the slot n+k+1, and the non-uplink slot does not participate in the slot numeration herein), or may be limited to any one of a downlink slot, a flexible slot, an uplink slot, and a hybrid slot, or limited to a combination of any two or more of a downlink slot, a flexible slot, an uplink slot, and a hybrid slot.

Optionally, in Embodiment 1 of the present disclosure, the uplink carrier may refer to a normal uplink carrier (NUL carrier, also referred to as a UL carrier in some cases) configured by uplinkConfigCommon and uplinkConfig (if any), or may refer to a supplementary uplink carrier (SUL carrier) configured by supplementaryUplinkConfig and supplementaryUplink (if any).

Optionally, in Embodiment 1 of the present disclosure, a correspondence between an uplink carrier and a downlink carrier may be determined according to a cell to which the uplink carrier and the downlink carrier belong (for example, a given uplink carrier corresponds to a downlink carrier belonging to the same cell), or may be determined according to other methods.

Optionally, in Embodiment 1 of the present disclosure, depending on a specific configuration mode, "all uplink carriers configured in the TAG" may also refer to all uplink carriers belonging to the TAG, "any uplink carrier configured in the TAG" may also refer to any uplink carrier belonging to the TAG, and "each uplink carrier configured in the TAG" may also refer to each uplink carrier belonging to the TAG.

Optionally, in Embodiment 1 of the present disclosure, depending on a specific configuration mode, "all downlink carriers configured in the TAG" may also refer to all downlink carriers belonging to the TAG, "any downlink carrier configured in the TAG" may also refer to any downlink carrier belonging to the TAG, and "each downlink carrier configured in the TAG" may also refer to each downlink carrier belonging to the TAG.

Optionally, in Embodiment 1 of the present disclosure, a correspondence between an uplink BWP and a downlink BWP may exist in all uplink BWPs, or may exist in only some uplink BWPs (for example, the correspondence exists only in the case of TDD, or whether the correspondence exists for a given uplink BWP or downlink BWP depends on a configuration of the uplink BWP or downlink BWP). The correspondence between the uplink BWP and the downlink BWP may be determined according to IDs of the BWPs (for example, an uplink BWP with an ID of 1 corresponds to a downlink BWP also with an ID of 1), or may be determined according to other methods. If the correspondence between the uplink BWP and the downlink BWP exists in only some uplink BWPs, "the downlink BWPs corresponding to all the uplink BWPs configured for all uplink carriers configured in the TAG" may also be expressed as "the downlink BWPs (if any) corresponding to all uplink BWPs configured for all uplink carriers configured in the TAG," where the downlink BWPs corresponding to all uplink BWPs may refer to the downlink BWPs respectively corresponding to the uplink BWPs.

Optionally, in Embodiment 1 of the present disclosure, unless otherwise specified, the initial active uplink BWP(s) may be one or a plurality of the following:

Initial active uplink BWPs configured for all uplink carriers configured for the UE.

An initial active uplink BWP configured for one of the uplink carriers configured for the UE, for example, an initial active uplink BWP configured for an uplink carrier configured in the cell that transmits the timing advance command.

Initial active uplink BWPs configured for all uplink carriers configured in the TAG.

An initial active uplink BWP configured for one of the uplink carriers configured in the TAG, for example, an initial active uplink BWP configured for an uplink carrier configured in a primary cell of a cell group (for example, an MCG, or an SCG) to which the TAG belongs.

An initial active uplink BWP configured for an uplink carrier on which the first uplink transmission after the UE receives the RAR is located.

Optionally, in Embodiment 1 of the present disclosure, unless otherwise specified, the initial active downlink BWP(s) may be one or a plurality of the following:

Initial active downlink BWPs configured for all downlink carriers configured for the UE.

An initial active downlink BWP configured for one of the downlink carriers configured for the UE, for example, an initial active downlink BWP configured for a downlink carrier configured in the cell that transmits the timing advance command.

Initial active downlink BWPs configured for all downlink carriers configured in all cells configured in the TAG.

An initial active downlink BWP configured for a downlink carrier configured in one of the cells configured in the TAG, for example, an initial active downlink BWP configured for a downlink carrier configured in a primary cell of the cell group (for example, an MCG, or an SCG) to which the TAG belongs.

Optionally, in Embodiment 1 of the present disclosure, "all uplink BWPs" configured for a given uplink carrier may include or may not include an initial active uplink BWP.

Optionally, in Embodiment 1 of the present disclosure, "all downlink BWPs" configured for a given downlink carrier may include or may not include an initial active downlink BWP.

In this way, according to the description in Embodiment 1, the present disclosure provides a method to improve the method for determining the time to apply an uplink transmission timing adjustment, so that the UE can adjust uplink transmission timing in a timely manner, ensuring that an uplink transmission timing error of the UE is maintained within a proper range.

Embodiment 2

A method performed by user equipment in Embodiment 2 of the present disclosure will be described below with reference to FIG. 3.

Figure 3:
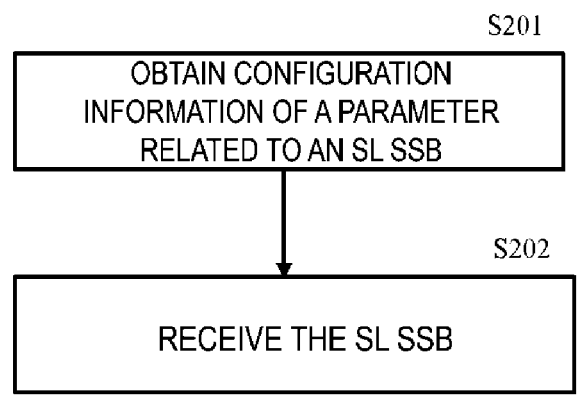
FIG. 3 is a flowchart showing a method performed by user equipment according to Embodiment 2 of the present disclosure.

FIG. 3 is a flowchart showing a method performed by user equipment according to Embodiment 2 of the present disclosure.

As shown in FIG. 3, in Embodiment 2 of the present disclosure, steps performed by the user equipment (UE) include: step S201 and step S202.

Specifically, in step S201, configuration information of a parameter related to an SL SSB (such as whether the parameter has been configured, or a configured value of the parameter) is obtained. For example, the configuration information is obtained from pre-defined information or pre-configured information, or the configuration information is obtained from a base station (for example, the configuration information is obtained by using DCI or a MAC CE or RRC signaling), or the configuration information is obtained from other UE, or a default value is used when the parameter is not configured.

Among them:
The parameter related to the SL SSB may include a parameter related to a time-frequency position (that is, the position of time and/or frequency) of the SL SSB. The time-frequency position of the SL SSB may be a time-frequency position at which the SL SSB is possibly transmitted (in this case, the SL SSB may also be referred to as a candidate SL SSB, and the time-frequency position is a time-frequency position of the candidate SL SSB), or may be a time-frequency position at which the SL SSB is actually transmitted.

The parameter related to the time-frequency position of the SL SSB may include the position of a subcarrier (for example, the position of a center frequency of the subcarrier), where an SCS corresponding to the subcarrier may be an SCS of the SL SSB. For example, the position of the subcarrier may correspond to the position of a specific subcarrier of the SL SSB, for example, the position of a subcarrier k of a resource block $n_{PRB}$ of the SL SSB. $n_{PRB}$ may be a value in a set $\{0, 1, \ldots, 19\}$, and k may be a value in a set $\{0, 1, \ldots, 11\}$.

The parameter related to the time-frequency position of the SL SSB may also include one or a plurality of the following:
Configuration information related to an SL carrier on which an SL BWP in which the SL SSB is located is located, for example, an offset (for example, represented by the number of resource blocks) between the lowest subcarrier (also known as point A) of a common resource block 0 and the lowest available subcarrier of the SL carrier, and/or an SCS of the SL carrier, and/or a carrier bandwidth (for example, represented by the number of resource blocks) of the SL carrier, and/or the position of a direct current subcarrier of the SL carrier.

Parameter configuration information related to the SL BWP in which the SL SSB is located, for example, the number of a starting resource block of the SL BWP, and/or the size of the SL BWP (for example, represented by the number of resource blocks).

The position of the SL SSB in the SL BWP, for example, the number of a starting resource block of the SL SSB in the SL BWP; for another example, the number of a starting subcarrier of the SL SSB in the SL BWP; for another example, the number of a starting subband of the SL SSB in the SL BWP.

The parameter related to SL SSB may also be obtained in other ways. Embodiment 2 of the present disclosure does not limit the method for obtaining the parameter related to the SL SSB. In addition, in step S202, the SL SSB is received according to the parameter related to the SL SSB.

Among them:
The SL SSB may include an SL PSS, an SL SSS, and a PSBCH.

The SL SSB may include 240 consecutive subcarriers in the frequency domain (for example, sequentially numbered as subcarriers 0, 1, ..., and 239 in ascending order of center frequencies of the subcarriers).

The SL SSB may include 4 consecutive OFDM symbols in the time domain (for example, sequentially numbered as OFDM symbols 0, 1, 2, and 3 in chronological order).

The length of a sequence used by the SL PSS (referred to as an SL PSS sequence in this disclosure) may be 127.

The length of a sequence used by the SL SSS (referred to as an SL SSS sequence in this disclosure) may be 127.

The SL PSS sequence and/or the SL SSS sequence may be related to a SL synchronization ID (SL synchronization identity, denoted as $N_{ID}^{SL}$). For example, different values of $N_{ID}^{SL}$ may correspond to different SL PSS sequences and/or SL SSS sequences.

A value range set of $N_{ID}^{SL}$ may be $\{0, 1, \ldots, 83\}$, or may be $\{0, 1, \ldots, 167\}$, or may be $\{0, 1, \ldots, 251\}$, or may be $\{0, 1, \ldots, 335\}$, or may be $\{0, 1, \ldots, 419\}$, or may be $\{0, 1, \ldots, 503\}$, or may be $\{0, 1, \ldots, 587\}$, or may be $\{0, 1, \ldots, 671\}$, or may be $\{0, 1, \ldots, 755\}$, or may be $\{0, 1, \ldots, 839\}$, or may be $\{0, 1, \ldots, 923\}$, or may be $\{0, 1, \ldots, 1007\}$, or may be $\{0, 1, \ldots, 1091\}$, or may be other integer set.

Optionally, $N_{ID}^{SL}$ may be determined by $N_{ID}^{SL(1)}$ and $N_{ID}^{SL(2)}$ for example, using one of the following methods:

$$N_{ID}^{SL} = 84 \cdot N_{ID}^{SL(2)} + N_{ID}^{SL(1)}$$

$$N_{ID}^{SL} = 168 \cdot N_{ID}^{SL(2)} + N_{ID}^{SL(1)}$$

$$N_{ID}^{SL} = 252 \cdot N_{ID}^{SL(2)} + N_{ID}^{SL(1)}$$

$$N_{ID}^{SL} = 336 \cdot N_{ID}^{SL(2)} + N_{ID}^{SL(1)}$$

$$N_{ID}^{SL} = 420 \cdot N_{ID}^{SL(2)} + N_{ID}^{SL(1)}$$

$$N_{ID}^{SL} = 504 \cdot N_{ID}^{SL(2)} + N_{ID}^{SL(1)}$$

$$N_{ID}^{SL} = 588 \cdot N_{ID}^{SL(2)} + N_{ID}^{SL(1)}$$

$$N_{ID}^{SL} = 672 \cdot N_{ID}^{SL(2)} + N_{ID}^{SL(1)}$$

$$N_{ID}^{SL} = 756 \cdot N_{ID}^{SL(2)} + N_{ID}^{SL(1)}$$

$$N_{ID}^{SL} = 840 \cdot N_{ID}^{SL(2)} + N_{ID}^{SL(1)}$$

$$N_{ID}^{SL} = 924 \cdot N_{ID}^{SL(2)} + N_{ID}^{SL(1)}$$

$$N_{ID}^{SL} = 1008 \cdot N_{ID}^{SL(2)} + N_{ID}^{SL(1)}$$

$$N_{ID}^{SL} = 1092 \cdot N_{ID}^{SL(2)} + N_{ID}^{SL(1)}$$

$$N_{ID}^{SL} = 5 \cdot N_{ID}^{SL(2)} + N_{ID}^{SL(2)}$$

$$N_{ID}^{SL} = 4 \cdot N_{ID}^{SL(1)} + N_{ID}^{SL(2)}$$

$$N_{ID}^{SL} = 3 \cdot N_{ID}^{SL(1)} + N_{ID}^{SL(2)}$$

$$N_{ID}^{SL} = 2 \cdot N_{ID}^{SL(1)} + N_{ID}^{SL(2)}$$

Optionally, time domain and frequency domain resources in the SL SSB occupied by the PSBCH may be one of the following:
  Subcarrier set {0, 1, . . . , 47} and subcarrier set {192, 193, . . . , 239} in OFDM symbol 1, subcarrier set {0, 1, . . . , 239} in OFDM symbol 2, and subcarrier set {0, 1, . . . , 239} in OFDM symbol 3.
  Subcarrier set {0, 1, . . . , 239} in OFDM symbol 1, subcarrier set {0, 1, . . . , 239} in OFDM symbol 2, subcarrier set {0, 1, . . . , 47} and subcarrier set {192, 193, . . . , 239} in OFDM symbol 3.
  Subcarrier set {0, 1, . . . , 239} in OFDM symbol 1, subcarrier set {0, 1, . . . , 47} and subcarrier set {192, 193, . . . , 239} in OFDM symbol 2, and subcarrier set {0, 1, . . . , 239} in OFDM symbol 3.
  Subcarrier set {0, 1, . . . , 47} and subcarrier set {192, 193, . . . , 239} in OFDM symbol 0, subcarrier set {0, 1, . . . , 239} in OFDM symbol 1, and subcarrier set {0, 1, . . . , 239} in OFDM symbol 2.
  Subcarrier set {0, 1, . . . , 239} in OFDM symbol 0, subcarrier set {0, 1, . . . , 239} in OFDM symbol 1, and subcarrier set {0, 1, . . . , 47} and subcarrier set {192, 193, . . . , 239} in OFDM symbol 2.
  Subcarrier set {0, 1, . . . , 239} in OFDM symbol 0, subcarrier set {0, 1, . . . , 47} and subcarrier set {192, 193, . . . , 239} in OFDM symbol 1, and subcarrier set {0, 1, . . . , 239} in OFDM symbol 2.
  Subcarrier set {0, 1, . . . , 47} and subcarrier set {192, 193, . . . , 239} in OFDM symbol 0, subcarrier set {0, 1, . . . , 239} in OFDM symbol 1, and subcarrier set {0, 1, . . . , 239} in OFDM symbol 3.
  Subcarrier set {0, 1, . . . , 239} in OFDM symbol 0, subcarrier set {0, 1, . . . , 239} in OFDM symbol 1, and subcarrier set {0, 1, . . . , 47} and subcarrier set {192, 193, . . . , 239} in OFDM symbol 3.
  Subcarrier set {0, 1, . . . , 239} in OFDM symbol 0, subcarrier set {0, 1, . . . , 47} and subcarrier set {192, 193, . . . , 239} in OFDM symbol 1, and subcarrier set {0, 1, . . . , 239} in OFDM symbol 3.
  Subcarrier set {0, 1, . . . , 47} and subcarrier set {192, 193, . . . , 239} in OFDM symbol 0, subcarrier set {0, 1, . . . , 239} in OFDM symbol 2, and subcarrier set {0, 1, . . . , 239} in OFDM symbol 3.
  Subcarrier set {0, 1, . . . , 239} in OFDM symbol 0, subcarrier set {0, 1, . . . , 239} in OFDM symbol 2, and subcarrier set {0, 1, . . . , 47} and subcarrier set {192, 193, . . . , 239} in OFDM symbol 3.
  Subcarrier set {0, 1, . . . , 239} in OFDM symbol 0, subcarrier set {0, 1, . . . , 47} and subcarrier set {192, 193, . . . , 239} in OFDM symbol 2, and subcarrier set {0, 1, . . . , 239} in OFDM symbol 3.

Optionally, when data of the PSBCH is mapped to an RE in the SL SSB, mapping may be performed in the time domain in one of the following sequences:
  OFDM symbol 0, OFDM symbol 1, OFDM symbol 2.
  OFDM symbol 0. OFDM symbol 1. OFDM symbol 3.
  OFDM symbol 0, OFDM symbol 2, OFDM symbol 1.
  OFDM symbol 0. OFDM symbol 2. OFDM symbol 3.
  OFDM symbol 0, OFDM symbol 3, OFDM symbol 1.
  OFDM symbol 0, OFDM symbol 3, OFDM symbol 2.
  OFDM symbol 1, OFDM symbol 0, OFDM symbol 2.
  OFDM symbol 1, OFDM symbol 0, OFDM symbol 3.
  OFDM symbol 1, OFDM symbol 2, OFDM symbol 0.
  OFDM symbol 1, OFDM symbol 2, OFDM symbol 3.
  OFDM symbol 1. OFDM symbol 3. OFDM symbol 0.
  OFDM symbol 1, OFDM symbol 3, OFDM symbol 2.
  OFDM symbol 2. OFDM symbol 0. OFDM symbol 1.
  OFDM symbol 2, OFDM symbol 0, OFDM symbol 3.
  OFDM symbol 2, OFDM symbol 1, OFDM symbol 0.
  OFDM symbol 2, OFDM symbol 1, OFDM symbol 3.
  OFDM symbol 2, OFDM symbol 3, OFDM symbol 0.
  OFDM symbol 2, OFDM symbol 3, OFDM symbol 1.
  OFDM symbol 3, OFDM symbol 0, OFDM symbol 1.
  OFDM symbol 3, OFDM symbol 0, OFDM symbol 2.
  OFDM symbol 3, OFDM symbol 1, OFDM symbol 0.
  OFDM symbol 3. OFDM symbol 1. OFDM symbol 2.
  OFDM symbol 3, OFDM symbol 2, OFDM symbol 0.
  OFDM symbol 3, OFDM symbol 2, OFDM symbol 1.

Optionally, time domain and frequency domain resources in the SL SSB occupied by a DM-RS used for the PSBCH may be one of the following:
  Subcarrier set {0+v, 4+v, 8+v, . . . , 44+v} and subcarrier set {192+v, 196+v, . . . , 236+v} in OFDM symbol 1, subcarrier set {0+v, 4+v, 8+v, . . . ,236+v} in OFDM symbol 2, and subcarrier set {0+v, 4+v, 8+v, . . . , 236+v} in OFDM symbol 3.
  Subcarrier set {0+v, 4+v, 8+v, . . . , 236+v} in OFDM symbol 1, subcarrier set; {0+v, 4+v, 8+v, . . . , 236+v} in OFDM symbol 2, and subcarrier set {0+v, 4+v, 8+v, . . . , 44+v} and subcarrier set {192+v, 196+v, . . . , 236+v} in OFDM symbol 3.
  Subcarrier set {0+v, 4+v, 8+v, . . . , 236+v} in OFDM symbol 1, subcarrier set {0+v, 4+v, 8+v, . . . , 44+v} and subcarrier set {192+v, 196+v, . . . , 236+v} in OFDM symbol 2, and subcarrier set {0+v, 4+v, 8+v, . . . , 236+v} in OFDM symbol 3.
  Subcarrier set {0+v, 4+v, 8+v, . . . , 44+v} and subcarrier set {192+v, 196+v, . . . , 236+v} in OFDM symbol 0, subcarrier set {0+v, 4+v, 8+v, . . . , 236+v} in OFDM symbol 1, and subcarrier set {0+v, 4+v, 8+v, . . . , 236+v} in OFDM symbol 2.
  Subcarrier set {0+v, 4+v, 8+v, . . . , 236+v} in OFDM symbol 0, subcarrier set {0+v, 4+v, 8+v, . . . , 236+v} in OFDM symbol 1, and subcarrier set {0+v, 4+v, 8+v, . . . , 44+v} and subcarrier set {192+v, 196+v, . . . , 236+v} in OFDM symbol 2.
  Subcarrier set {0+v, 4+v, 8+v, . . . , 236+v} in OFDM symbol 0, subcarrier set {0+v, 4+v, 8+v, . . . , 44+v) and subcarrier set (192+v, 196+v, . . . , 236+v} in OFDM symbol 1, and subcarrier set {0+v, 4+v, 8+v, . . . , 236+v} in OFDM symbol 2.
  Subcarrier set {0+v, 4+v, 8+v, . . . , 44+v} and subcarrier set {192+v, 196+v, 236+v} in OFDM symbol 0, subcarrier set {0+v, 4+v, 8+v, . . . ,236+v} in OFDM symbol 1, and subcarrier set {0+v, 4+v, 8+v, . . . , 236+v} in OFDM symbol 3.
  Subcarrier set {0+v, 4+v, 8+v, . . . , 236+v} in OFDM symbol 0, subcarrier set {0+v, 4+v, 8+v, . . . , 236+v} in OFDM symbol 1, and subcarrier set {0+v, 4+v, 8+v, . . . , 44+v} and subcarrier set {192+v, 196+v, . . . , 236+v} in OFDM symbol 3.
  Subcarrier set {0+v, 4+v, 8+v, . . . , 236+v} in OFDM symbol 0, subcarrier set {0+v, 4+v, 8+v, . . . , 44+v) and subcarrier set (192+v, 196+v, . . . , 236+v} in OFDM symbol 1, and subcarrier set {0+v, 4+v, 8+v, . . . , 236+v} in OFDM symbol 3.
  Subcarrier set {0+v, 4+v, 8+v, . . . , 44+v} and subcarrier set {192+v, 196+v, . . . , 236+v} in OFDM symbol 0, subcarrier set {0+v, 4+v, 8+v, . . . ,236+v} in OFDM symbol 2, and subcarrier set {0+v, 4+v, 8+v, . . . , 236+v} in OFDM symbol 3.
  Subcarrier set {0+v, 4+v, 8+v, . . . , 236+v} in OFDM symbol 0, subcarrier set {0+v, 4+v, 8+v, . . . , 236+v} in OFDM symbol 2, and subcarrier set {0+v, 4+v, 8+v, . . . , 44+v} and subcarrier set {192+v, 196+v, . . . , 236+v} in OFDM symbol 3.

Subcarrier set {0+v, 4+v, 8+v, . . . , 236+v} in OFDM symbol 0, subcarrier set {0+v, 4+v, 8+v, . . . , 44+v) and subcarrier set (192+v, 196+v, . . . , 236+v} in OFDM symbol 2, and subcarrier set {0+v, 4+v, 8+v, . . . , 236+v} in OFDM symbol 3.

v is an integer constant. For example, v may be equal to $N_{ID}^{SL}$ mod 4.

Optionally, when the DM-RS used for the PSBCH is mapped to the RE in the SL SSB, mapping may be performed in the time domain in one of the following sequences:

OFDM symbol 0, OFDM symbol 1, OFDM symbol 2.
OFDM symbol 0, OFDM symbol 1, OFDM symbol 3.
OFDM symbol 0, OFDM symbol 2, OFDM symbol 1.
OFDM symbol 0. OFDM symbol 2. OFDM symbol 3.
OFDM symbol 0, OFDM symbol 3, OFDM symbol 1.
OFDM symbol 0, OFDM symbol 3, OFDM symbol 2.
OFDM symbol 1, OFDM symbol 0, OFDM symbol 2.
OFDM symbol 1, OFDM symbol 0, OFDM symbol 3.
OFDM symbol 1, OFDM symbol 2, OFDM symbol 0.
OFDM symbol 1, OFDM symbol 2, OFDM symbol 3.
OFDM symbol 1, OFDM symbol 3, OFDM symbol 0.
OFDM symbol 1, OFDM symbol 3, OFDM symbol 2.
OFDM symbol 2. OFDM symbol 0. OFDM symbol 1.
OFDM symbol 2, OFDM symbol 0, OFDM symbol 3.
OFDM symbol 2. OFDM symbol 1. OFDM symbol 0.
OFDM symbol 2, OFDM symbol 1, OFDM symbol 3.
OFDM symbol 2, OFDM symbol 3, OFDM symbol 0.
OFDM symbol 2, OFDM symbol 3, OFDM symbol 1.
OFDM symbol 3, OFDM symbol 0, OFDM symbol 1.
OFDM symbol 3, OFDM symbol 0, OFDM symbol 2.
OFDM symbol 3, OFDM symbol 1, OFDM symbol 0.
OFDM symbol 3. OFDM symbol 1. OFDM symbol 2.
OFDM symbol 3, OFDM symbol 2, OFDM symbol 0.
OFDM symbol 3. OFDM symbol 2. OFDM symbol 1.

Optionally, the SL PSS sequence may be defined as one of the following:

$d_{PSS}(n) = 1 - 2x(m)$ $d_{PSS}(n) = 2x(m) - 1$ where:

$m = (n + P \cdot (2 \cdot N_{ID}^{SL(2)} + 1)) \mod 127$ $0 \leq n < 127$

P is a constant. P may be one of 17, 18, 19, 20, 21, 22, 23, 24, and 25.

$x(i+7) = (x(i+4) + x(i)) \mod 2$ $[x(6)\ x(5)\ x(4)\ x(3)\ x(2)\ x(1)\ x(0)] = [1\ 1\ 1\ 0\ 1\ 1\ 0]$ Optionally, the SL SSS sequence may be defined as one of the following:

$d_{SSS}(n) = [1 - 2x_0((n+m_0) \mod 127)][1 - 2x_1((n+m_1) \mod 127)]$ $d_{SSS}(n) = [2x_0((n+m_0) \mod 127) - 1][1 - 2x_1((n+m_1) \mod 127)]$ $d_{SSS}(n) = [1 - 2x_0((n+m_0) \mod 127)][2x_1((n+m_1) \mod 127) - 1]$ $d_{SSS}(n) = [2x_0((n+m_0) \mod 127) - 1][2x_1((n+m_1) \mod 127) - 1]$ where:

○ $m_0 = 15 \cdot \left\lfloor \frac{N_{ID}^{SL(1)}}{112} \right\rfloor + 5 \cdot N_{ID}^{SL(2)} + Q$ $m_1 = N_{ID}^{SL(1)} \mod 112$ $0 \leq n < 127$ Q is a constant. Q may be one of 45, 50, 55, 60, 65, and 70.

$x_0(i+7) = (x_0(i+4) + x_0(i)) \mod 2$ $x_1(i+7) = (x_1(i+1) + x_1(i)) \mod 2$ $[x_0(6)\ x_0(5)\ x_0(4)\ x_0(3)\ x_0(2)\ x_0(1)x_0(0)] = [0\ 0\ 0\ 0\ 0\ 0\ 1]$ $[x_1(6)\ x_1(5)\ x_1(4)\ x_1(3)\ x_1(2)\ x_1(1)x_0(0)] = [0\ 0\ 0\ 0\ 0\ 0\ 1]$ Optionally, the time domain and frequency domain resources in the SL SSB occupied by the SL PSS may be one or two subcarrier sets in OFDM symbol s. s may be 0, or may be 1, or may be 2, or may be 3, and the one or two subcarrier sets may be one of the following:

{0, 1, . . . , 126}
{1, 2, . . . , 127}
{2, 3, . . . , 128}
{3, 4, . . . , , 129}
{4, 5, . . . , 130}
{5, 6, . . . , 131}
{6, 7, . . . , 132}
{7, 8, . . . , 133}
{8, 9, . . . , 134}
{9, 10, . . . , 135}
{10, 11, . . . , 136}
{11, 12, . . . , 137}
{12, 13, . . . , 138}
{13, 14, . . . , 139}
{14, 15, . . . , 140}
{15, 16, . . . , 141}
{16, 17, . . . , 142}
{17, 18 . . . . , 143}
{18, 19, . . . , 144}
{19, 20, . . . , 145}
{20, 21, . . . , 146}
{21, 22, . . . , 147}
{22, 23, . . . , 148}
{23, 24, . . . , 149}
{24, 25, . . . , 150}
{25, 26, . . . , 151}
{26, 27, . . . , 152}
{27, 28, . . . , 153}
{28, 29, . . . , 154}
{29, 30, . . . , 155}
{30, 31, . . . , 156}
{31, 32, . . . , 157}
{32, 33, . . . , 158}
{33, 34, . . . , 159}
{34, 35, . . . , 160}
{35, 36, . . . , 161}
{36, 37, . . . , 162}
{37, 38, . . . , 163}
{38, 39, . . . , 164}
{39, 40, . . . , 165}
{40, 41, . . . , 166}
{41, 42, . . . , 167}
{42, 43, . . . , 168}
{43, 44, . . . , 169}
{44, 45, . . . , 170}

{45, 46, . . . , 171}
{46, 47, . . . , 172}
{47, 48 . . . , 173}
{48, 49, . . . , 174}
{49, 50, . . . , 175}
{50, 51, . . . , 176}
{51, 52, . . . , 177}
{52, 53, . . . , 178}
{53, 54, . . . , 179}
{54, 55, . . . , 180}
{55, 56, . . . , 181}
{56, 57, . . . , 182}
{57, 58, . . . , 183}
158, 59, . . . , 184
{59, 60, . . . , 185}
160, 61, . . . , 186
{61, 62, . . . , 187}
{62, 63, . . . , 188}
{63, 64, . . . , 189}
{64, 65, . . . , 190}
{65, 66, . . . , 191}
{66, 67, . . . , 192}
{67, 68, . . . , 193}
{68, 69, . . . , 194}
{69, 70, . . . , 195}
{70, 71, . . . , 196}
{71, 72, . . . , 197}
{72, 73, . . . , 198}
{73, 74, . . . , 199}
{74, 75, . . . , 200}
{75, 76, . . . , 201}
{76, 77, . . . , 202}
{77, 78, . . . , 203}
{78, 79, . . . , 204}
{79, 80, . . . , 205}
{80, 81, . . . , 206}
{81, 82, . . . , 207}
{82, 83, . . . , 208}
{83, 84, . . . , 209}
{84, 85, . . . , 210}
{85, 86, . . . , 211}
{86, 87, . . . , 212}
{87, 88, . . . , 213}
{88, 89, . . . , 214}
{89, 90, . . . , 215}
{90, 91, . . . , 216}
{91, 92, . . . , 217}
{92, 93, . . . , 218}
{93, 94, . . . , 219}
{94, 95, . . . , 220}
{95, 96, . . . , 221}
{96, 97, . . . , 222}
{97, 98, . . . , 223}
{98, 99, . . . , 224}
{99, 100, . . . , 225}
{100, 101, . . . , 226}
{101, 102, . . . , 227}
{102, 103, . . . , 228}
{103, 104, . . . , 229}
{104, 105, . . . , 230}
{105, 106, . . . , 231}
{106, 107, . . . , 232}
{107, 108, . . . , 233}
{108, 109, . . . , 234}
{109, 110, . . . , 235}
{110, 111, . . . , 236}
{111, 112, . . . , 237}
{112, 113, . . . , 238}
{113, 114, . . . , 239}
{55}, {183, 184, . . . , 308}
{54, 55}, {183, 184, . . . , 307}
{53, 54, 55}, {183, 184, . . . , 306}
{52, 53, . . . , 55}, {183, 184, . . . , 305}
{51, 52, . . . , 55}, {183, 184, . . . , 304}
{50, 51, . . . , 55}, {183, 184, . . . , 303}
{49, 50, . . . , 55}, {183, 184, . . . , 302}
{48, 49, . . . , 55}, {183, 184, . . . , 301}
{47, 48, . . . , 55}, {183, 184, . . . , 300}
{46, 47, . . . , 55}, {183, 184, . . . , 299}
{45, 46, . . . , 55}, {183, 184, . . . , 298}
{44, 45, . . . , 55}, {183, 184, . . . , 297}
{43, 44, . . . , 55}, {183, 184, . . . , 296}
{42, 43, . . . , 55}, {183, 184, . . . , 295}
{41, 42, . . . , 55}, {183, 184, . . . , 294}
{40, 41, . . . , 55}, {183, 184, . . . , 293}
{39, 40, . . . , 55}, {183, 184, . . . , 292}
{38, 39, . . . , 55}, {183, 184, . . . , 291}
{37, 38, . . . , 55}, {183, 184, . . . , 290}
{36, 37, . . . , 55}, {183, 184, . . . , 289}
{35, 36, . . . , 55}, {183, 184, . . . , 288}
{34, 35, . . . , 55}, {183, 184, . . . , 287}
{33, 34, . . . , 55}, {183, 184, . . . , 286}
{32, 33, . . . , 55}, {183, 184, . . . , 285}
{31, 32, . . . , 55}, {183, 184, . . . , 284}
{30, 31, . . . , 55}, {183, 184, . . . , 283}
{29, 30, . . . , 55}, {183, 184, . . . , 282}
{28, 29, . . . , 55}, {183, 184, . . . , 281}
{27, 28, . . . , 55}, {183, 184, . . . , 280}
{26, 27, . . . , 55}, {183, 184, . . . , 279}
{25, 26, . . . , 55}, {183, 184, . . . , 278}
{24, 25, . . . , 55}, {183, 184, . . . , 277}
{23, 24, . . . , 55}, {183, 184, . . . , 276}
{22, 23, . . . , 55}, {183, 184, . . . , 275}
{21, 22, . . . , 55}, {183, 184, . . . , 274}
{20, 21, . . . , 55}, {183, 184, . . . , 273}
{19, 20, . . . , 55}, {183, 184, . . . , 272}
{18, 19, . . . , 55}, {183, 184, . . . , 271}
{17, 18, . . . , 55}, {183, 184, . . . , 270}
{16, 17, . . . , 55}, {183, 184, . . . , 269}
{15, 16, . . . , 55}, {183, 184, . . . , 268}
{14, 15, . . . , 55}, {183, 184, . . . , 267}
{13, 14, . . . , 55}, {183, 184, . . . , 266}
{12, 13, . . . , 55}, {183, 184, . . . , 265}
{11, 12, . . . , 55}, {183, 184, . . . , 264}
{10, 11, . . . , 55}, {183, 184, . . . , 263}
{9, 10, . . . , 55}, {183, 184, . . . , 262}
{8, 9, . . . , 55}, {183, 184, . . . , 261}
{7, 8, . . . , 55}, {183, 184, . . . , 260}
{6, 7, . . . , 55}, {183, 184, . . . , 259}
{5, 6, . . . , 55}, {183, 184, . . . , 258}
{4, 5, . . . , 55}, {183, 184, . . . , 257}
{3, 4, . . . , 55}, {183, 184, . . . , 256}
{2, 3, . . . , 55}, {183, 184, . . . , 255}
{1, 2, . . . , 55}, {183, 184, . . . , 254}
{0, 1, . . . , 55}, {183, 184, . . . , 253}

Optionally, when the SL PSS is mapped to the RE in the SL SSB, the mapping may be performed in the frequency domain in descending order of subcarrier numbers. For example, if the SL PSS sequence is denoted as $d_{PSS}(0), d_{PSS}(1), \ldots, d_{PSS}(126)$, when the SL PSSs are mapped to REs (denoted as $(k, l)_{p,\mu}$, where k is the number of a subcarrier, l is the number of an OFDM symbol, p is the number of an antenna port, and p is a subcarrier spacing configuration) in the SL SSB, the mapping is performed in descending order of k. Optionally, the mapping may be performed in ascending or descending order of l (when the SL PSSs occupy only one OFDM symbol, there is no difference whether mapping is performed in ascending order of l or in descending order of l). For example, if the SL PSSs occupy subcarrier set {57, 58, . . . , 183} in OFDM symbol 0, $d_{PSS}(0)$ is mapped to (l=0, k=183), $d_{PSS}(1)$ is mapped to (l=0, k=182), . . . , and $d_{PSS}(126)$ is mapped to (l=0, k=57).

Optionally, when the SL PSS is mapped to the RE in the SL SSB, the mapping may also be performed in the frequency domain in ascending order of subcarrier numbers.

Optionally, the time domain and frequency domain resources occupied by the SL SSS may be one or two subcarrier sets in OFDM symbol s. s may be 0, or may be 1, or may be 2, or may be 3, and the one or two subcarrier sets may be one of the following:

{0, 1, . . . , 126}
{1, 2, . . . , 127}
{2, 3, . . . , 128}
{3, 4, . . . , 129}
{4, 5, . . . , 130}
{5, 6, . . . , 131}
{6, 7 . . . . , 132}
{7, 8, . . . , 133}
{8, 9, . . . , 134}
{9, 10, . . . , 135}
{10, 11, . . . , 136}
{11, 12, . . . , 137}
{12, 13, . . . , 138}
{13, 14, . . . , 139}
{14, 15, . . . , 140}
{15, 16, . . . , 141}
{16, 17, . . . , 142}
{17, 18, . . . , 143}
{18, 19, . . . , 144}
{19, 20, . . . , 145}
{20, 21, . . . , 146}
{21, 22, . . . , 147}
{22, 23, . . . , 148}
{23, 24, . . . , 149}
{24, 25, . . . , 150}
{25, 26, . . . , 151}
{26, 27, . . . , 152}
{27, 28, . . . , 153}
{28, 29, . . . , 154}
{29, 30, . . . , 155}
{30, 31, . . . , 156}
{31, 32, . . . , 157}
{32, 33, . . . , 158}
{33, 34, . . . , 159}
{34, 35, . . . , 160}
{35, 36, . . . , 161}
{36, 37, . . . , 162}
{37, 38, . . . , 163}
{38, 39, . . . , 164}
{39, 40, . . . , 165}
{40, 41, . . . , 166}
{41, 42, . . . , 167}
{42, 43, . . . , 168}
{43, 44, . . . , 169}
{44, 45, . . . , 170}
{45, 46, . . . , 171}
{46, 47, . . . , 172}
{47, 48, . . . , 173}
{48, 49, . . . , 174}
{49, 50, . . . , 175}
{50, 51, . . . , 176}
{51, 52, . . . , 177}
{52, 53, . . . , 178}
{53, 54, . . . , 179}
{54, 55, . . . , 180}
{55, 56, . . . , 181}
{56, 57, . . . , 182}
{57, 58, . . . , 183}
{58, 59, . . . , 184}
{59, 60, . . . , 185}
{60, 61, . . . , 186}
{61, 62, . . . , 187}
{62, 63, . . . , 188}
{63, 64, . . . , 189}
{64, 65, . . . , 190}
{65, 66, . . . , 191}
{66, 67, . . . , 192}
{67, 68, . . . , 193}
{68, 69, . . . , 194}
{69, 70, . . . , 195}
{70, 71, . . . , 196}
{71, 72, . . . , 197}
{72, 73, . . . , 198}
{73, 74, . . . , 199}
{74, 75, . . . , 200}
{75, 76, . . . , 201}
{76, 77, . . . , 202}
{77, 78, . . . , 203}
{78, 79, . . . , 204}
{79, 80, . . . , 205}
{80, 81, . . . , 206}
{81, 82, . . . , 207}
{82, 83, . . . , 208}
{83, 84, . . . , 209}
{84, 85, . . . , 210}
{85, 86, . . . , 211}
{86, 87, . . . , 212}
{87, 88, . . . , 213}
{88, 89, . . . , 214}
{89, 90, . . . , 215}
{90, 91, . . . , 216}
{91, 92, . . . , 217}
{92, 93, . . . , 218}
{93, 94, . . . , 219}
{94, 95, . . . , 220}
{95, 96, . . . , 221}
{96, 97, . . . , 222}
{97, 98, . . . , 223}
{98, 99, . . . , 224}
{99, 100, . . . , 225}
{100, 101, . . . , 226}
{101, 102, . . . , 227}
{102, 103, . . . , 228}
{103, 104, . . . , 229}
{104, 105, . . . , 230}
{105, 106, . . . , 231}
{106, 107, . . . , 232}
{107, 108, . . . , 233}
{108, 109, . . . , 234}
{109, 110, . . . , 235}
{110, 111, . . . , 236}
{1111, 112, . . . , 237}
{112, 113, . . . , 238}
{113, 114, . . . , 239}
{55}, {183, 184, . . . , 308}

{54, 55}, {183, 184, ..., 307}
{53, 54, 55}, {183, 184, ..., 306}
{52, 53, ..., 55}, {183, 184, ..., 305}
{51, 52, ..., 55}, {183, 184, ..., 304}
{50, 51, ..., 55}, {183, 184, ..., 303}
{49, 50, ..., 55}, {183, 184, ..., 302}
{48, 49, ..., 55}, {183, 184, ..., 301}
{47, 48, ..., 55}, {183, 184, ..., 300}
{46, 47, ..., 55}, {183, 184, ..., 299}
{45, 46, ..., 55}, {183, 184 ..., 298}
{44, 45, ..., 55}, {183, 184, ..., 297}
{43, 44, ..., 55}. {183, 184 ..., 296}
{42, 43, ..., 55}, {183, 184, ..., 295}
{41, 42, ..., 55}, {183, 184, ..., 294}
{40, 41, ..., 55}, {183, 184, ..., 293}
{39, 40, ..., 55}, {183, 184, ..., 292}
{38, 39, ..., 55}, {183, 184, ..., 291}
{37, 38, ..., 55}, {183, 184, ..., 290}
{36, 37, ..., 55}, {183, 184 ..., 289}
{35, 36, ..., 55}, {183, 184, ..., 288}
{34, 35, ..., 55}, {183, 184 ..., 287}
{33, 34, ..., 55}, {183, 184, ..., 286}
{32, 33, ..., 55}, {183, 184, ..., 285}
{31, 32, ..., 55}, {183, 184, ..., 284}
{30, 31, ..., 55}, {183, 184, ..., 283}
{29, 30, ..., 55}, {183, 184, ..., 282}
{28, 29, ..., 55}, {183, 184, ..., 281}
{27, 28, ..., 55}, {183, 184, ..., 280}
{26, 27, ..., 55}, {183, 184, ..., 279}
{25, 26, ..., 55}. {183, 184 ..., 278}
{24, 25, ..., 55}, {183, 184, ..., 277}
{23, 24, ..., 55}, {183, 184, ..., 276}
{22, 23, ..., 55}, {183, 184, ..., 275}
{21, 22, ..., 55}, {183, 184, ..., 274}
{20, 21, ..., 55}, {183, 184, ..., 273}
{19, 20, ..., 55}, {183, 184, ..., 272}
{18, 19, ..., 55}, {183, 184, ..., 271}
{17, 18, ..., 55}, {183, 184, ..., 270}
{16, 17, ..., 55}, {183, 184, ..., 269}
{15, 16, ..., 55}, {183, 184, ..., 268}
{14, 15, ..., 55}, {183, 184, ..., 267}
{13, 14, ..., 55}, {183, 184, ..., 266}
{12, 13, ..., 55}, {183, 184, ..., 265}
{11, 12, ..., 55}, {183, 184, ..., 264}
{10, 11, ..., 55}, {183, 184, ..., 263}
{9, 10, ..., 55}, {183, 184, ..., 262}
{8, 9, ..., 55}, {183, 184, ..., 261}
{7, 8, ..., 55}, {183, 184, ..., 260}
{6, 7, ..., 55}, {183, 184, ..., 259}
{5, 6, ..., 55}, {183, 184, ..., 258}
{4, 5, ..., 55}, {183, 184, ..., 257}
{3, 4, ..., 55}, {183, 184, ..., 256}
{2, 3, ..., 55}, {183, 184, ..., 255}
{1, 2, ..., 55}, {183, 184, ..., 254}
{0, 1, ..., 55}, {183, 184, ..., 253}

Optionally, when the SL PSS is mapped to the RE in the SL SSB, the mapping may be performed in the frequency domain in descending order of subcarriers. For example, if the SL SSS sequence is denoted as $d_{SSS}(0)$, $d_{SSS}(1)$, ..., $d_{SSS}(126)$, when the SL SSSs are mapped to REs (denoted as $(k, l)_{p,\mu}$, where k is the number of a subcarrier, l is the number of an OFDM symbol, p is the number of an antenna port, and μ is a subcarrier spacing configuration) in the SL SSB, the mapping is performed in descending order of k. Optionally, the mapping may be performed in ascending or descending order of l (when the SL SSSs occupy only one OFDM symbol, there is no difference whether mapping is performed in ascending order of l or in descending order of l). For example, if the SL SSSs occupy subcarrier set {57, 58, ..., 183} in OFDM symbol 2, $d_{SSS}(0)$ is mapped to (l=2, k=183), $d_{SSS}(1)$ is mapped to (l=2, k=182), ..., and $d_{SSS}(126)$ is mapped to (l=2, k=57).

Optionally, when the SL SSS is mapped to the RE in the SL SSB, the mapping may also be performed in the frequency domain in ascending order of subcarrier numbers.

In this way, according to the description in Embodiment 2, the present disclosure provides a method to improve a resource mapping method for an SL PSS and/or an SL SSS and/or a PSBCH in an SL SSB, and/or design of an SL synchronization ID, and/or design of an SL PSS sequence, and/or design of an SL SSS sequence, etc., preventing 5G (Rel-15) UE from erroneously confusing part or all of the SL SSB with part or all of an SSB and unnecessarily increasing a cell search and/or system access time.

Embodiment 3

A method performed by user equipment in Embodiment 3 of the present disclosure will be described below with reference to FIG. 4.

Figure 4:
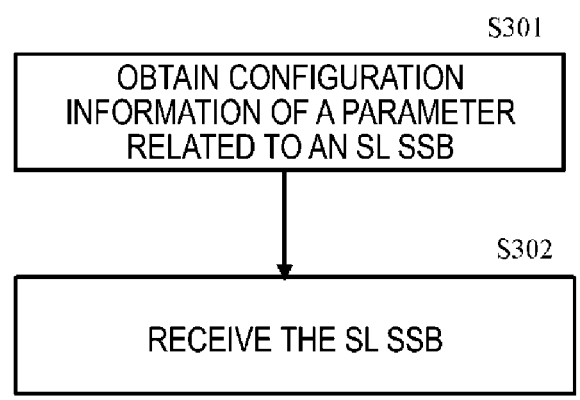
FIG. 4 is a flowchart showing a method performed by user equipment according to Embodiment 3 of the present disclosure.

FIG. 4 is a flowchart showing a method performed by user equipment according to Embodiment 3 of the present disclosure.

As shown in FIG. 4, in Embodiment 3 of the present disclosure, steps performed by the user equipment (UE) include: step S301 and step S302.

Specifically, in step S301, configuration information of a parameter related to an SL SSB is obtained. For example, the configuration information is obtained from pre-defined information or pre-configured information, or the configuration information is obtained from a base station (for example, the configuration information is obtained by using DCI or a MAC CE or RRC signaling), or the configuration information is obtained from other UE, or a default configuration is used when the parameter is not configured.

Among them:

The SL SSB may include an SL PSS, an SL SSS, and a PSBCH.

The SL SSB may include 240 consecutive subcarriers in the frequency domain.

The SL SSB may be an SL SSB that is possibly transmitted (or referred to as a candidate SL SSB), or may be an SL SSB that is actually transmitted.

The configuration information may include an indication of a reference frequency position. For example, a parameter absoluteFrequencySL-SSB whose type is ARFCN-ValueNR is used to indicate a reference frequency position. The position of the SL SSB in the frequency domain may also be indicated in other ways, for example, by indicating a reference frequency position and an offset.

The configuration information may include an SCS of the SL SSB. For example, an SCS is indicated by a parameter sl-ssbSubcarrierSpacing whose type is SubcarrierSpacing.

In addition, in step S302, the position of each subcarrier of the SL SSB in the frequency domain is determined according to the configuration information. The position of the subcarrier in the frequency domain may refer to the position of a center frequency of the subcarrier.

For example, when the position of each subcarrier of the SL SSB in the frequency domain is determined, it is assumed that the reference frequency position corresponds to the position of subcarrier k of resource block $n_{PRB}$ in the SL SSB, where $n_{PRB}$ may be a value in a set $\{0,1,\ldots,19\}$, k may be a value in a set $\{0, 1, \ldots, 11\}$, and $n_{PRB}=10$ and k=0 are not used at the same time. For example, if $n_{PRB}=0$ and k=0, the reference frequency position indicated by the parameter absoluteFrequencySL-SSB is 3000000 kHz, and the SCS indicated by the parameter sl-ssbSubcarrierSpacing is 15 kHz, then the position of subcarrier 0 of the SL SSB in the frequency domain is 3000000 kHz, the position of subcarrier 1 in the frequency domain is 3000015 kHz, the position of subcarrier 2 in the frequency domain is 3000030 kHz, . . . , and the position of subcarrier 239 in the frequency domain is 3003585 kHz.

According to the method in Embodiment 3 above, when the position of a subcarrier of an SL SSB in the frequency domain is determined, the interpretation of an indicated reference frequency position is different from that in 5G (Rel-15), preventing 5G (Rel-15) UE from erroneously confusing the SL SSB with an SSB and unnecessarily increasing a cell search and/or system access time.

Embodiment 4

A method performed by user equipment in Embodiment 4 of the present disclosure will be described below with reference to FIG. 5.

Figure 5:
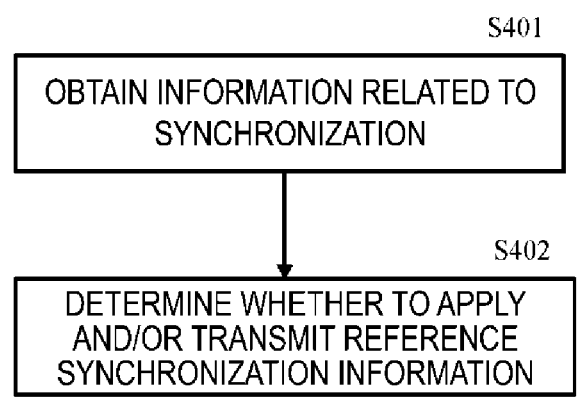
FIG. 5 is a flowchart showing a method performed by user equipment according to Embodiment 4 of the present disclosure.

FIG. 5 is a flowchart showing a method performed by user equipment according to Embodiment 4 of the present disclosure.

As shown in FIG. 5, in Embodiment 4 of the present disclosure, steps performed by the user equipment (UE) include the following steps.

Specifically, in step S401, information related to synchronization is obtained. For example, the information related to synchronization is obtained once at time $t_0$, and is recorded as first synchronization information; the information related to synchronization is obtained again at time $t_1$, and is recorded as second synchronization information.

Among them:

The time $t_0 \leq t_1$.

The information related to synchronization may be predefined information or pre-configured information stored in the UE, or may be configuration information received by the UE from other entities, for example, configuration information obtained from a GNSS system, or configuration information obtained from an SSB, an SL SSB, an SIB, etc., transmitted by an LTE or 5G base station. Methods for obtaining the first synchronization information and the second synchronization information may be the same, or may be different.

The entity that transmits the SL SSB may be other UE (such as LTE UE or 5G UE), or may be a 5G base station, or may be an LTE base station, or may be other entities.

The SL SSB may include an SL PSS, an SL SSS, and a PSBCH. The PSBCH may carry an SL MIB.

The configuration information indicated by the SL SSB may include one or a plurality of the following:

Information related to OFDM symbols, for example, OFDM symbol timing, SCS, length, CP type, etc.

Information related to slots and/or subframes and/or frames, for example, slot timing, direct slot number, direct subframe number, direct frame number, etc.

The SL SSB may also indicate information related to a synchronization reference (or referred to as a synchronization source), for example, an identifier of the synchronization reference, or the type of an entity corresponding to the synchronization reference, or a priority of the entity corresponding to the synchronization reference, etc.

Among them:

The information related to synchronization may be associated with one or a plurality of synchronization references. If the information related to synchronization is associated with a plurality of synchronization references, the content of configuration information indicated by the plurality of synchronization references may not be exactly the same. For example, direct slot numbers, direct subframe numbers, and direct frame numbers indicated by SL SSBs transmitted at different times may be different, but all indicate the same frame structure information, symbol timing, and slot timing information.

The synchronization reference may refer to an entity that provides the information related to synchronization.

The synchronization reference may be a direct synchronization reference, or may be an indirect synchronization reference. For example, if entities B and C obtain the information related to synchronization from an entity A, and the entity B indicates the information related to synchronization to the UE, but the entity C does not indicate the information related to synchronization to the UE, the entity A is a direct synchronization reference of the entity B and the entity C, the entity B is a direct synchronization reference of the UE, the entity A is an indirect synchronization reference of the UE, and the entity C is neither a direct synchronization reference of the UE nor an indirect synchronization reference of the UE.

Among the one or a plurality of synchronization references associated with the information related to synchronization, there may be a root synchronization reference. The root synchronization reference is a direct synchronization reference or an indirect synchronization reference of all the other synchronization references.

The SL SSB may indicate information related to the one or a plurality of synchronization references associated with the information related to synchronization, for example, one or a plurality of the following:

The type of the one or a plurality of synchronization references associated with the information related to synchronization, for example, the type (such as GNSS) of the root synchronization reference associated with the information related to synchronization.

The number of synchronization references associated with the information related to synchronization (including or excluding the entity that indicates the information related to synchronization to the UE).

A coverage status of the one or a plurality of synchronization references associated with the information related to synchronization. For example, the coverage status may be "in coverage", for example, RSRP and/or RSRQ and/or other measured quantities measured at a frequency used for SL communication meet a specific condition (such as an "S criterion" for cell selection). For another example, the coverage status may be "out of coverage", for example, RSRP and/or RSRQ and/or other measured quantities measured at the frequency used for SL communication do not meet the corresponding "in coverage" condition.

In addition, in step S402, whether to apply and/or transmit the reference synchronization information is determined according to one or a plurality of the following:
The time $t_0$.
The time $t_1$.
The first synchronization information.
The second synchronization information.
Information related to the synchronization reference associated with the first synchronization information.
Information related to the synchronization reference associated with the second synchronization information.

The reference synchronization information may be the first synchronization information or the second synchronization information.

For example, if one or a plurality of the following (in any combination by "and" or "or") is satisfied, the reference synchronization information is applied, and/or the reference synchronization information is transmitted:
- A priority of one or a plurality of synchronization references associated with the first synchronization information satisfies a specific relation with a priority of one or a plurality of synchronization references associated with the second synchronization information. For example, the former is higher than the latter; or the former is equal to the latter; or the former is lower than the latter.
- A coverage status of the one or a plurality of synchronization references associated with the first synchronization information satisfies a specific relation with a coverage status of the one or a plurality of synchronization references associated with the second synchronization information. For example, the former is "in coverage" and the latter is "out of coverage"; or the former is "out of coverage" and the latter is "in coverage"; or the former is "out of coverage" and the latter is "out of coverage"; or the former is "in coverage" and the latter is "in coverage".
- The number of synchronization references associated with the first synchronization information satisfies a specific relation with the number of synchronization references associated with the second synchronization information. For example, the former is greater than the latter; or the former is equal to the latter, or the former is smaller than the latter.
- $t_1-t_0$ meet a specific condition. For example, $t_1-t_0 \geq \Delta$; or $t_1-t_0 > \Delta$; or $t_1-t_0 < \Delta$; or $t_1-t_0 \leq \Delta$. $\Delta$ may be a pre-defined or pre-configured constant, or may be a parameter configured by using higher layer signaling.

Specifically, for example, if a priority of a root synchronization reference associated with the first synchronization information is lower than a priority of a root synchronization reference associated with the second synchronization information, the second synchronization information is applied and/or the second synchronization information is transmitted; for another example, if the root synchronization reference associated with the first synchronization information is in an "out of coverage" state, the root synchronization reference associated with the second synchronization information is in an "in coverage" state, the second synchronization information is applied and/or the second synchronization information is transmitted; for another example, if the number of synchronization references associated with the first synchronization information is greater than the number of synchronization references associated with the second synchronization information, the second synchronization information is applied and/or the second synchronization information is transmitted.

In this way, according to the description in Embodiment 4, the present disclosure provides a method for forwarding received synchronization information that meets a specific condition (such as the highest priority), so that UE under various coverage conditions can use the same synchronization information, and can further perform SL communication with each other.

Embodiment 5

A method performed by user equipment in Embodiment 5 of the present disclosure will be described below with reference to FIG. 6.

Figure 6:
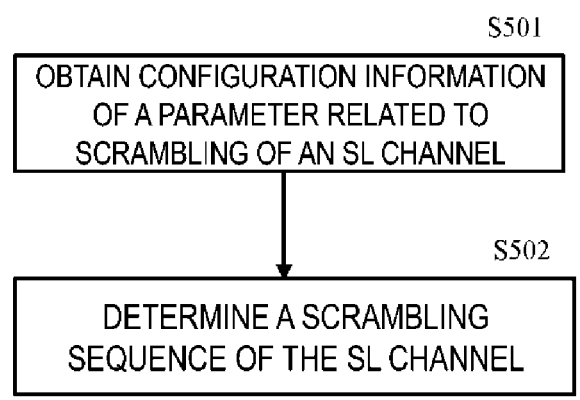
FIG. 6 is a flowchart showing a method performed by user equipment according to Embodiment 5 of the present disclosure.

FIG. 6 is a flowchart showing a method performed by user equipment according to Embodiment 5 of the present disclosure.

As shown in FIG. 6, in Embodiment 5 of the present disclosure, steps performed by the user equipment (UE) include the following steps.

Specifically, in step S501, configuration information of a parameter related to scrambling of an SL channel (such as whether the parameter has been configured, or a configured value of the parameter) is obtained. For example, the configuration information is obtained from pre-defined information or pre-configured information, or the configuration information is obtained from a base station (for example, the configuration information is obtained by using DCI or a MAC CE or RRC signaling), or the configuration information is obtained from other UE, or a default value is used when the parameter is not configured.

Among them:
The SL channel may be a channel related to SL synchronization, or a channel related to SL communication, or other channels transmitted on an SL carrier. Specifically, the channel may be a PSBCH, or may be a PSCCH, or may be a PSSCH, or may be a PSFCH.
The parameter may include one or a plurality of the following:
An SL synchronization ID (denoted as $N_{ID}^{SL}$). The value range of $N_{ID}^{SL}$ may be the same as that in Embodiment 2, or may be other value ranges.
A first scrambling code ID (denoted as $n_{ID,1}$). A value set of $n_{ID,1}$ may be $\{0, 1, \ldots, 65535\}$, or a subset of $\{0, 1, \ldots, 65535\}$. Optionally, $n_{ID,1}$ may be an identifier related to one or a plurality of transmissions on the SL channel, for example, an RNTI allocated to the UE, or the ID of the UE, or the ID of target UE, or the ID of a target UE group, or an SL synchronization ID. Optionally, $n_{ID,1}$ may also be equal to an SL synchronization ID.
A second scrambling code ID (denoted as $n_{ID,2}$). A value set of $n_{ID,2}$ may be $\{0, 1, \ldots, 65535\}$, or a subset of $\{0, 1, \ldots, 65535\}$ (for example, $\{0, 1, \ldots, 1023\}$, or $\{1024, 1025, \ldots, 2047\}$, or $\{2048, 2049, \ldots, 4095\}$, or $\{4096, 4097, \ldots, 6143\}$, or other subsets). Optionally, $n_{ID,2}$ may be an identifier related to one or a plurality of transmissions on the SL channel, for example, an RNTI allocated to the UE, or the ID of the UE, or the ID of the target UE, or the ID of the target UE group. Optionally, $n_{ID,2}$ may also be equal to the SL synchronization ID.

A first offset constant (denoted as $M_1$). $M_1$ may be a pre-defined constant in set $\{0, 1, \ldots, 65535\}$ (for example, $M_1=1008$. For another example, $M_1=1024$).

A second offset constant (denoted as $M_2$). $M_2$ may be a pre-defined constant in set $\{0, 1, \ldots, 65535\}$ (for example, $M_2=1024$. For another example, $M_2=1008$).

In addition, in step S502, a scrambling sequence of the SL channel is determined according to the configuration information.

Among them:

The scrambling sequence may be a pseudo-random sequence.

For example, the pseudo-random sequence c(n) may be defined as follows:

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

where:

$N_C=1600$.

$x_1(n)$ is initialized to $x_1(0)=1$, $x_1(n)=0$, $n=1, 2, \ldots, 30$.

$x_2(n)$ is initialized to $c_{init}=\Sigma_{i=0}^{30} x_2(i) \cdot 2^i$, where the value of $c_{init}$ may be one of the following:

$$c_{init}=N_{ID}^{SL};$$

$$c_{init}=N_{ID}^{SL}+M_1.$$

$$c_{init}=n_{ID,1} \cdot 2^{15}+n_{ID,2}.$$

$$c_{init}=n_{ID,1} \cdot 2^{15}+n_{ID,2}+M_2.$$

In this way, according to the description in Embodiment 5, the present disclosure provides a method to at least partially avoid conflicts between a scrambling sequence of an SL channel and a scrambling sequence of a 5G (Rel-15) related channel (such as a PBCH, a PUSCH, a PUCCH, etc.) when the scrambling sequence of the SL channel is initialized, thereby greatly reducing possible mutual interference between the SL channel and the 5G (Rel-15) related channel.

Variational Embodiment

Figure 7:
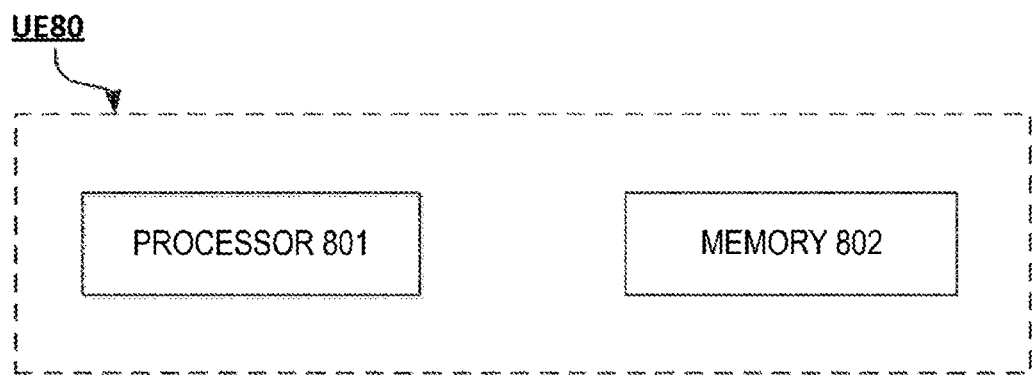
FIG. 7 is a block diagram schematically showing user equipment related to the present disclosure.

Hereinafter, FIG. 7 is used to illustrate user equipment that can execute the method executed by user equipment described in detail above in the present disclosure as a variant embodiment.

FIG. 7 is a block diagram showing user equipment (UE) related to the present disclosure.

As shown in FIG. 7, user equipment (UE) 80 includes a processor 801 and a memory 802. The processor 801 may include, for example, a microprocessor, a microcontroller, an embedded processor, etc. The memory 802 may include, for example, a volatile memory (such as a Random Access Memory (RAM)), a Hard Disk Drive (HDD), a non-volatile memory (such as a flash memory), or other memories. The memory 802 stores program instructions. The instructions, when executed by the processor 801, can perform the above method performed by user equipment described in detail in this disclosure.

The methods and related devices according to the present disclosure have been described above in conjunction with preferred embodiments. It should be understood by those skilled in the art that the methods shown above are only exemplary, and the above-described embodiments can be combined with one another as long as no contradiction arises. The method of the present disclosure is not limited to the steps and sequence shown above. The network node and the user equipment illustrated above may include more modules; for example, they may further include modules which can be developed or developed in the future to be applied to modules of a base station, an MME, or UE. Various identifiers shown above are only exemplary, not for limitation, and the present disclosure is not limited to specific information elements serving as examples of these identifiers. Those skilled in the art can make various alterations and modifications according to the teachings of the illustrated embodiments.

It should be understood that the above embodiments of the present disclosure may be implemented through software, hardware, or a combination of software and hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In the present application, the term "base station" may refer to a mobile communication data and control switching center with large transmit power and a wide coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer and the like.

In addition, the embodiments of the present disclosure disclosed herein may be implemented on a computer program product. More specifically, the computer program product is a product provided with a computer-readable medium having computer program logic encoded thereon. When being executed on a computing device, the computer program logic provides related operations to implement the above-described technical solutions of the present disclosure. When being executed on at least one processor of a computing system, the computer program logic enables the processor to perform the operations (methods) described in the embodiments of the present disclosure. Such an arrangement of the present disclosure is typically provided as software, code, and/or other data structures that are configured or encoded on a computer-readable medium, such as an optical medium (for example, a CD-ROM), a floppy disk, or a hard disk, or other media such as firmware or microcode on one or more ROM or RAM or PROM chips, or downloadable software images, shared database and so on in one or more modules. Software or firmware or such configuration may be installed on a computing equipment such that one or more processors in the computing equipment perform the technical solutions described in the embodiments of the present disclosure.

In addition, each functional module or each feature of the base station device and the terminal device used in each of the above embodiments may be implemented or executed by a circuit, which is usually one or a plurality of integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general-purpose processor may be a microprocessor; or the processor may be an existing processor, a controller, a microcontroller, or a state machine. The above-mentioned general purpose processor or each circuit may be configured with a digital circuit or may be configured with a logic circuit. In addition, when an advanced technology that can replace current integrated circuits emerges because of advances in semiconductor technology, the present disclosure may also use integrated circuits obtained using this advanced technology.

Although the present disclosure has been shown in connection with the preferred embodiments disclosed herein, it will be understood by those skilled in the art that various modifications, substitutions, and alterations may be made therein without departing from the spirit and scope of the present disclosure. Accordingly, the present disclosure should not be defined by the above-described embodiments, but should be defined by the appended claims and their equivalents.

The invention claimed is:

1. A user equipment comprising:
receiving circuitry configured to receive a random access response including a timing advance command, the timing advance command indicating an index value $T_A$ in a form of a timing advance command field of 12 bits, the timing advance command corresponding to a Timing Advanced Group (TAG), the TAG being one of multiple TAGs;
transmitting circuitry configured to adjust, based on a timing advance value $N_{TA}$, uplink transmission timing for the TAG with a subcarrier spacing (SCS), the timing advance value $N_{TA}$ being determined based on (i) the index value $T_A$ and (ii) SCS configuration $\mu$ of the SCS; and
processing circuitry configured to determine a value N with respect to a minimum SCS among SCSs of all configured uplink bandwidth parts (UL BWPs) for all uplink carriers in the TAG and for all configured initial UL BWPs each provided by a higher-layer parameter initialuplinkBWP, wherein
the value N is a maximum timing advance value in milliseconds that is providable by the timing advance command field of 12 bits, and
the adjustment to the uplink transmission timing is applied from a starting point of an uplink slot, the uplink slot being based on (a) an uplink slot in which the timing advance command is received and (b) the value N.

2. A method performed by a user equipment comprising:
receiving a random access response, the random access response including a timing advance command indicating an index value $T_A$ in a form of a timing advance command field of 12 bits, the timing advance command corresponding to a Timing Advanced Group (TAG), the TAG being one of multiple TAGs;
adjusting, based on a timing advance value $N_{TA}$, uplink transmission timing for the TAG with a subcarrier spacing (SCS), the timing advance value $N_{TA}$ being determined based on (i) the index value $T_A$ and (ii) SCS configuration $\mu$ of the SCS; and
determining a value N with respect to a minimum SCS among SCSs of all configured uplink bandwidth parts (UL BWPs) for all uplink carriers in the TAG and for all configured initial UL BWPs each provided by a higher-layer parameter initialuplinkBWP, wherein the value N is a maximum timing advance value in milliseconds that is providable by the timing advance command field of 12 bits, and
the adjustment to the uplink transmission timing is applied from a starting point of an uplink slot, the uplink slot being based on (a) an uplink slot in which the timing advance command is received and (b) the value N.

3. A base station comprising:
processing circuitry configured to generate a random access response including a timing advance command, the timing advance command indicating an index value $T_A$ in a form of a timing advance command field of 12 bits, the timing advance command corresponding to a Timing Advanced Group (TAG), the TAG being one of multiple TAGs, (i) the index value $T_A$ and (ii) a subcarrier spacing (SCS) configuration $\mu$ of the SCS being used by a user equipment to determine a timing advance value $N_{TA}$ based on which the user equipment determines uplink transmission timing for the TAG with the SCS; and
transmitting circuitry configured to transmit the random access response to the user equipment, wherein
the processing circuitry is configured to generate a higher-layer parameter initialuplinkBWP based on which the user equipment determines a value N with respect to a minimum subcarrier spacing (SCS) among SCSs of all configured UL BWPs for all uplink carriers in the TAG and for all configured initial UL BWPs each provided by the higher-layer parameter,
the transmitting circuitry is configured to transmit the higher-layer parameter to the user equipment,
the value N is a maximum timing advance value in milliseconds that is providable by the timing advance command field of 12 bits, and
the adjustment to the uplink transmission timing is applied from a starting point of an uplink slot, the uplink slot being based on (a) an uplink slot in which the timing advance command is received and (b) the value N.

4. A method performed by a base station comprising:
generating a random access response including a timing advance command, the timing advance command indicating an index value $T_A$ in a form of a timing advance command field of 12 bits, the timing advance command corresponding to a Timing Advanced Group (TAG), the TAG being one of multiple TAGs, (i) the index value $T_A$ and (ii) a subcarrier spacing (SCS) configuration $\mu$ of the SCS being used by a user equipment to determine a timing advance value $N_{TA}$ based on which the user equipment determines uplink transmission timing for the TAG with the SCS;
transmitting the random access response to the user equipment;
generating a higher-layer parameter initialuplinkBWP based on which the user equipment determines a value N with respect to a minimum subcarrier spacing (SCS) among SCSs of all configured UL BWPs for all uplink carriers in the TAG and for all configured initial UL BWPs each provided by the higher-layer parameter; and
transmitting the higher-layer parameter to the user equipment, wherein
the value N is a maximum timing advance value in milliseconds that is providable by the timing advance command field of 12 bits, and the adjustment to the uplink transmission timing is applied from a starting point of an uplink slot, the uplink slot being based on (a) an uplink slot in which the timing advance command is received and (b) the value N.

* * * * *